(12) United States Patent
Yokomitsu et al.

(10) Patent No.: US 8,102,274 B2
(45) Date of Patent: Jan. 24, 2012

(54) COMMUNICATION APPARATUS, COMMUNICATION SYSTEM, COMMUNICATION METHOD, INTEGRATED CIRCUIT AND CIRCUIT MODULE

(75) Inventors: Yasushi Yokomitsu, Fukuoka (JP); Noriaki Maehara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 12/234,047

(22) Filed: Sep. 19, 2008

(65) Prior Publication Data
US 2009/0074044 A1      Mar. 19, 2009

(30) Foreign Application Priority Data

Sep. 19, 2007   (JP) ................................ 2007-242159
Feb. 18, 2008   (JP) ................................ 2008-036046

(51) Int. Cl.
*G08B 3/00* (2006.01)
(52) U.S. Cl. .................................... 340/691.1; 340/538
(58) Field of Classification Search .............. 340/691.1, 340/538, 538.15, 531; 375/225; 370/252, 370/468, 235
See application file for complete search history.

(56) References Cited

U.S. PATENT DOCUMENTS

| | | | |
|---|---|---|---|
| 6,507,622 | B2 | 1/2003 | Maki |
| 2005/0210157 | A1 | 9/2005 | Sakoda |
| 2007/0159981 | A1 | 7/2007 | Chang |
| 2007/0167144 | A1 | 7/2007 | Koga |
| 2007/0195956 | A1* | 8/2007 | Gavette ........................ 380/277 |

FOREIGN PATENT DOCUMENTS

| | | |
|---|---|---|
| JP | 11-163807 | 6/1999 |
| JP | 2005-253047 | 9/2005 |

OTHER PUBLICATIONS

PCT International Search Report dated Jan. 19, 2009.

* cited by examiner

*Primary Examiner* — Anh V La
(74) *Attorney, Agent, or Firm* — Dickinson Wright PLLC

(57) ABSTRACT

A communication apparatus which transmits data to another communication apparatus through a transmission channel, includes: a display which displays a plurality of communication rates; and a controller which permits the display to display the communication rates. The controller acquires a first communication rate received from the another communication apparatus and based on a predetermined signal transmitted to the another communication apparatus through the transmission channel at a first time. The controller acquires a second communication rate received from the another communication apparatus and based on a predetermined signal transmitted to the another communication apparatus through the transmission channel at a second time. The controller calculates a plurality of communication rates on the basis of the first and second communication rate. The controller permits the display to display the plurality of the communication rate when a difference between the plurality of communication rates is larger than a predetermined value.

16 Claims, 32 Drawing Sheets

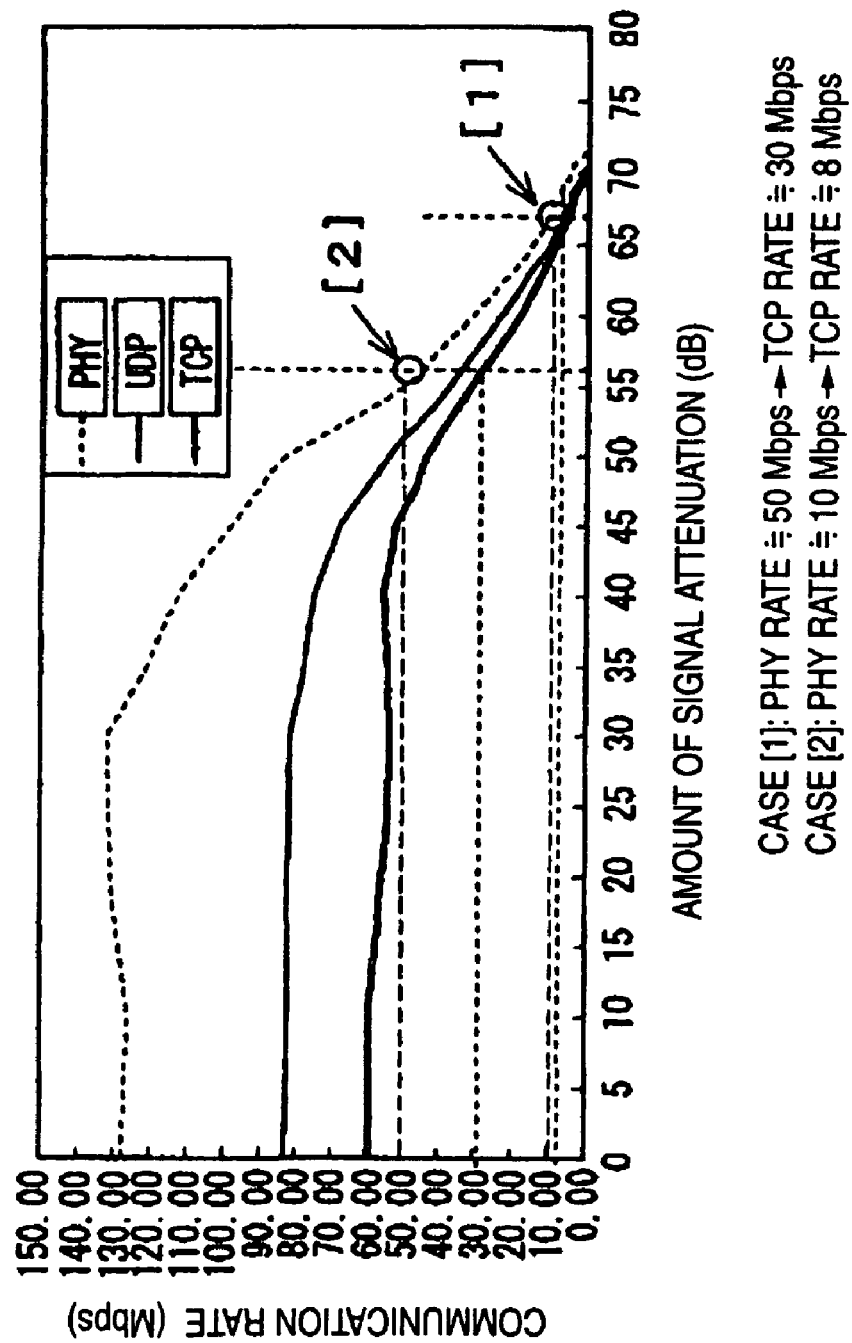

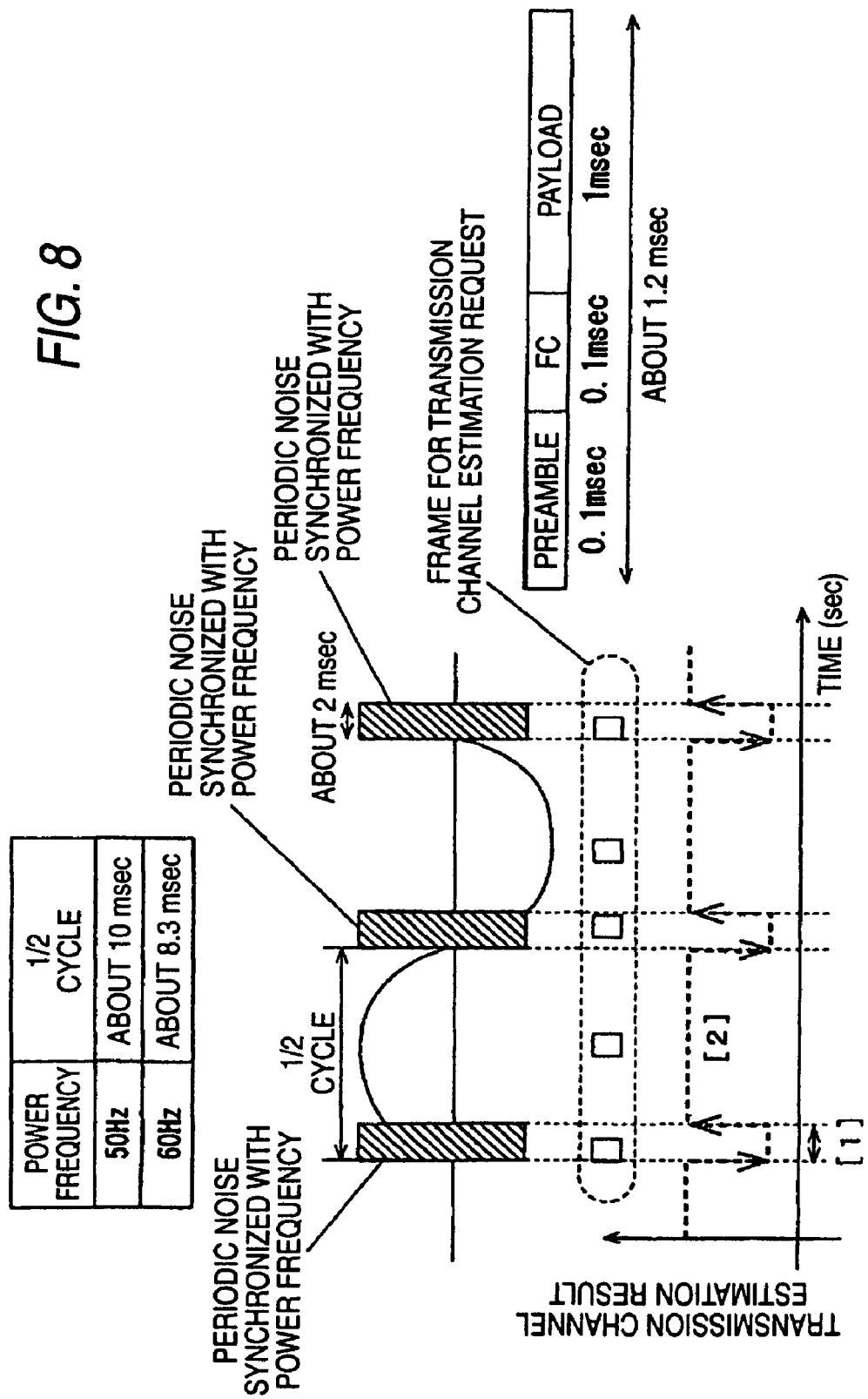

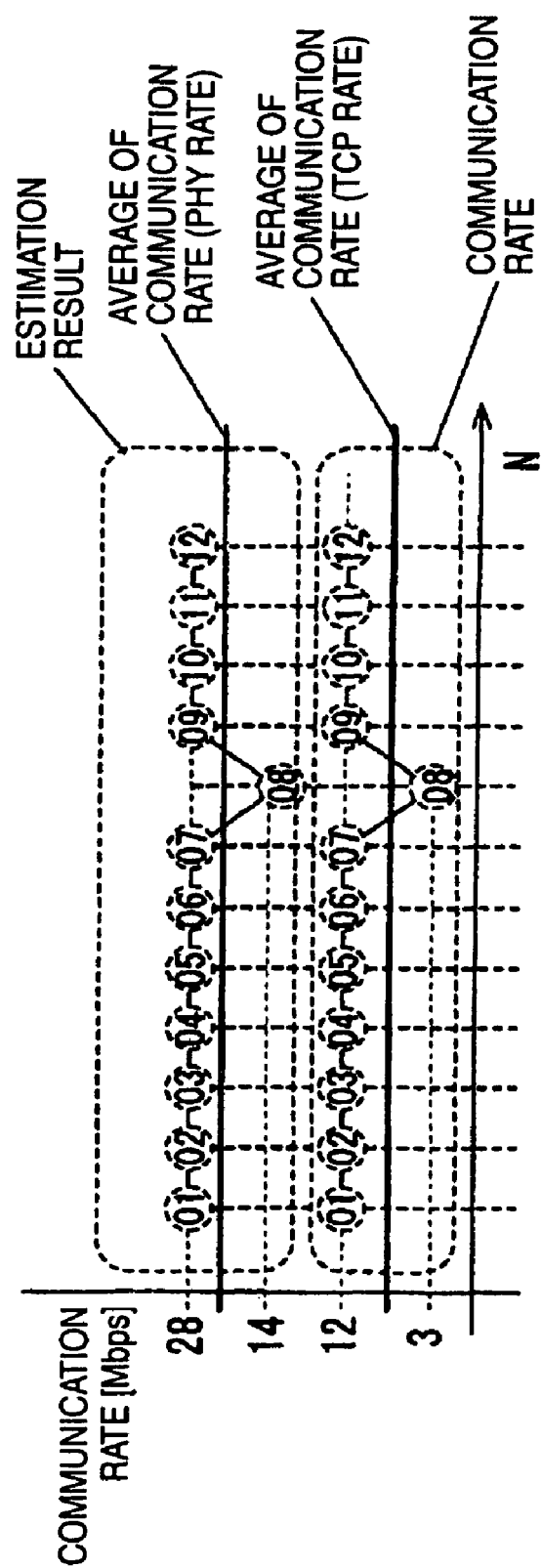

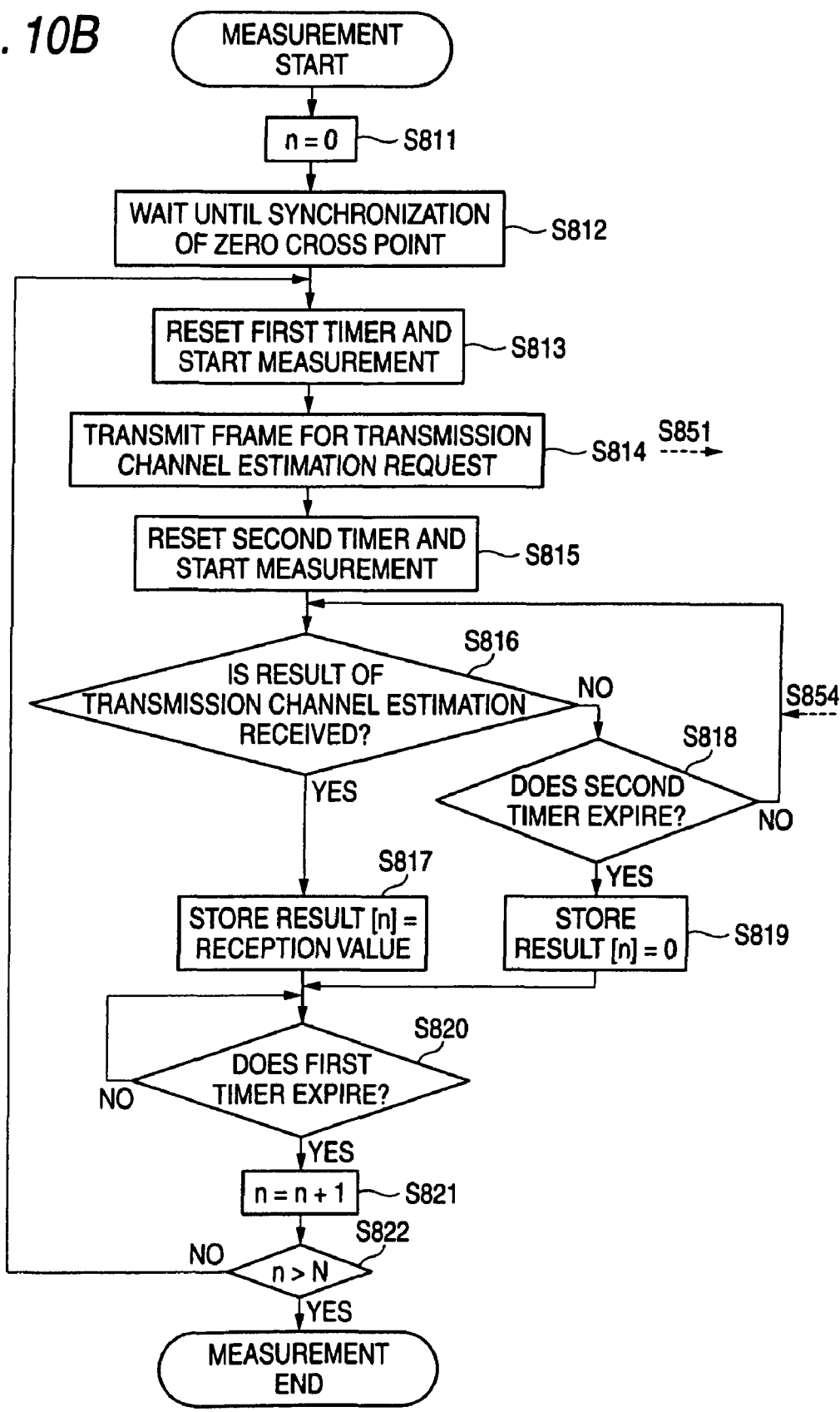

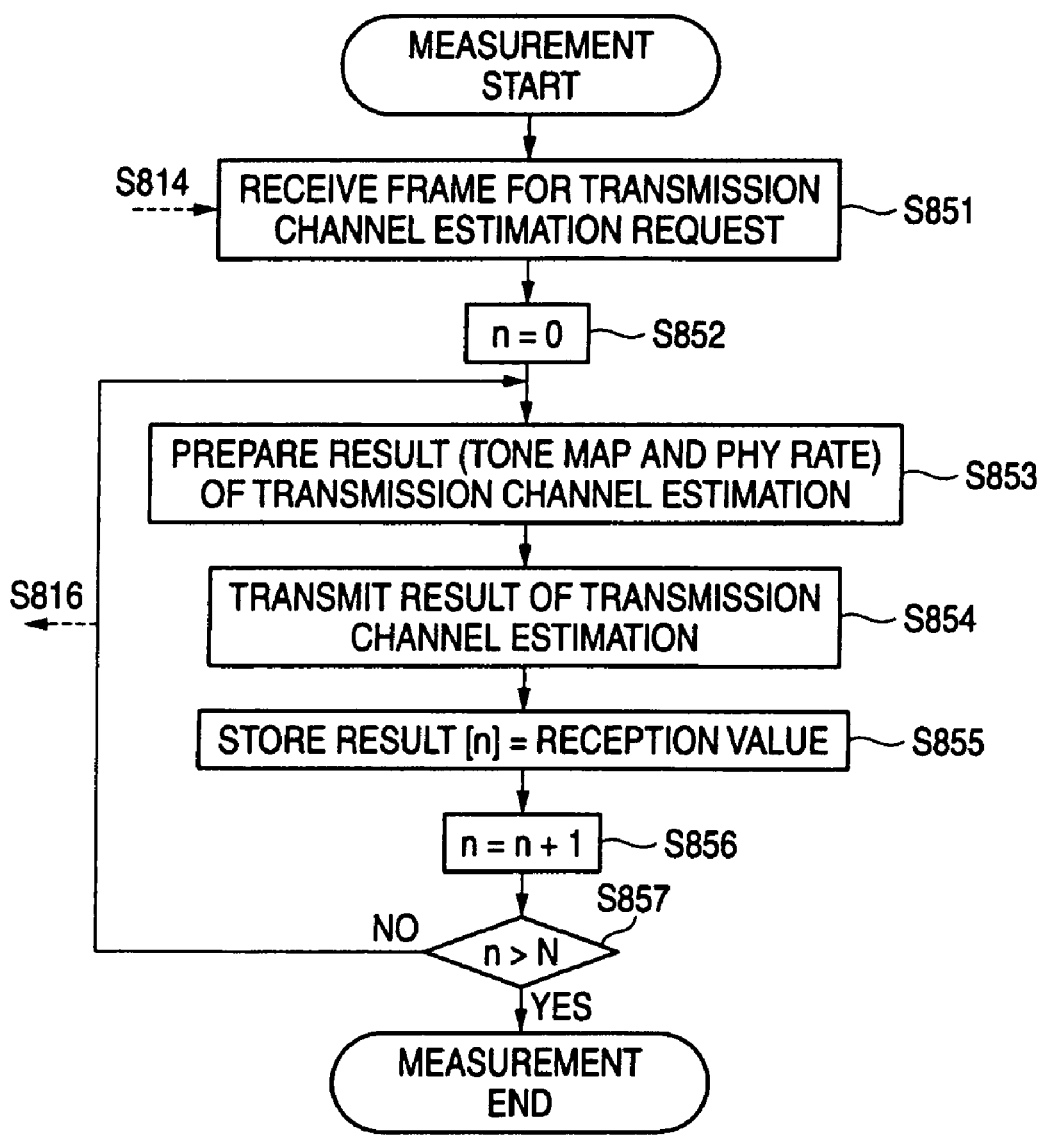

FIG. 11

| POWER FREQUENCY [Hz] | 60 | GENERATION PERIOD OF NOISE (CYCLE [msec]) | | 8.33 | PRACTICE PERIOD OF TRANSMISSION CHANNEL ESTIMATION [msec] | 500 |
|---|---|---|---|---|---|---|
| OFFSET TIME OF MEASUREMENT START | 0 | | | | | |
| No | TIME | CLOSEST GENERATION TIMING OF NOISE | | | ACCORDANCE DETERMINATION | |
| 0 | 0 | 0.00 | 0.00 | 8.33 | BINGO | — |
| 1 | 500 | 491.67 | 500.00 | 508.33 | — | BINGO |
| 2 | 1000 | 991.67 | 1000.00 | 1008.33 | — | BINGO |
| 3 | 1500 | 1491.67 | 1500.00 | 1508.33 | — | BINGO |
| 4 | 2000 | 1991.67 | 2000.00 | 2008.33 | — | BINGO |
| 5 | 2500 | 2491.67 | 2500.00 | 2508.33 | — | BINGO |
| 6 | 3000 | 2991.67 | 3000.00 | 3008.33 | — | BINGO |
| 7 | 3500 | 3491.67 | 3500.00 | 3508.33 | — | BINGO |
| 8 | 4000 | 3991.67 | 4000.00 | 4008.33 | — | BINGO |
| 9 | 4500 | 4491.67 | 4500.00 | 4508.33 | — | BINGO |
| 10 | 5000 | 4991.67 | 5000.00 | 5008.33 | — | BINGO |
| 11 | 5500 | 5491.67 | 5500.00 | 5508.33 | — | BINGO |
| 12 | 6000 | 5991.67 | 6000.00 | 6008.33 | — | BINGO |

FIG. 12A

| OFFSET FROM ZERO CROSS POINT AT START OF TRANSMISSION CHANNEL ESTIMATION [msec] | 0 | 1 | 2 | 3 | 4 | 5 | 6 | 7 | 8 |
|---|---|---|---|---|---|---|---|---|---|
| NUMBER OF TIMES ACCORDING WITH PERIODIC NOISE IN 12 TIMES MEASUREMENT | 12 | 12 | 12 | 0 | 0 | 0 | 0 | 12 | 12 |

PRACTICE PERIOD OF TRANSMISSION CHANNEL ESTIMATION = 500 msec
POWER FREQUENCY = 60 Hz (GENERATION PERIOD OF NOISE = 8.33 msec)

FIG. 12B

| OFFSET FROM ZERO CROSS POINT AT START OF TRANSMISSION CHANNEL ESTIMATION | 0 | 1 | 2 | 3 | 4 | 5 | 6 | 7 | 8 | 9 |
|---|---|---|---|---|---|---|---|---|---|---|
| NUMBER OF TIMES ACCORDING WITH PERIODIC NOISE IN 12 TIMES MEASUREMENT | 12 | 12 | 12 | 0 | 0 | 0 | 0 | 0 | 12 | 12 |

PRACTICE PERIOD OF TRANSMISSION CHANNEL ESTIMATION = 500 msec
POWER FREQUENCY = 50 Hz (GENERATION PERIOD OF NOISE = 10 msec)

FIG. 19

[CASE 1] CASE WHERE TRANSMISSION CHANNEL IS IN POOR STATE AND INFLUENCE OF VARIATIONS IN NOISE IS PRESENT

| | MEASUREMENT NUMBER | CASE 1 | |
|---|---|---|---|
| | 1 | 22.0 | |
| | 2 | 22.0 | |
| | 3 | 21.0 | |
| | 4 | 21.0 | |
| | 5 | 20.0 | |
| | 6 | 20.0 | |
| | 7 | 21.0 | |
| | 8 | 21.0 | |
| | 9 | 19.0 | |
| | 10 | 20.0 | |
| | 11 | 20.0 | |
| | 12 | 0.0 | NO REPLY OR NO MEASURABLE STATE |
| | ESTIMATION METHOD 1 (13) | 19.8 | SIMPLE ESTIMATION FROM MEASUREMENT RESULT |
| | ESTIMATION METHOD 2 (14) | 18.9 | MEASUREMENT WITH GOOD PRECISION |
| | ESTIMATION METHOD 3 (15) | 12.3 | MEASUREMENT WITH BETTER PRECISION |
| ESTIMATION METHOD 1 | AVERAGE | 20.6 | CALCULATION OF AVERAGE VALUE WITHOUT CONSIDERATION OF NO REPLY OR NO MEASURABLE STATE |
| | (AVERAGE + MINIMUM)/2 | 19.8 | |
| | ESTIMATION RESULT EVAL1 | 19.8 | ESTIMATION RESULT IS USED |
| ESTIMATION METHOD 2 | AVERAGE | 18.9 | CALCULATION OF AVERAGE VALUE IN CONSIDERATION OF NO REPLY OR NO MEASURABLE STATE |
| | Δ2 | 3.0 | CALCULATION OF DIFFERENCE BETWEEN MAXIMUM VALUE AND MINIMUM VALUE OF MEASUREMENT VALUE (EXCLUDING NO REPLY) |
| | ESTIMATION RESULT EVAL2 | 18.9 | SINCE Δ2 IS SMALLER THAN 10 Mbps, RETRANSMISSION RATIO (35%) IS NOT TAKEN INTO CONSIDERATION |
| ESTIMATION METHOD 3 | AVERAGE | 18.9 | CALCULATION OF AVERAGE VALUE IN CONSIDERATION OF NO REPLY OR NO MEASURABLE STATE |
| | Δ3 | 22.0 | CALCULATION OF DIFFERENCE BETWEEN MAXIMUM VALUE AND MINIMUM VALUE OF MEASUREMENT VALUE (INCLUDING NO REPLY) |
| | ESTIMATION RESULT EVAL3 | 12.3 | SINCE Δ3 IS LARGER THAN 10 Mbps, RETRANSMISSION RATIO (35%) IS TAKEN INTO CONSIDERATION |

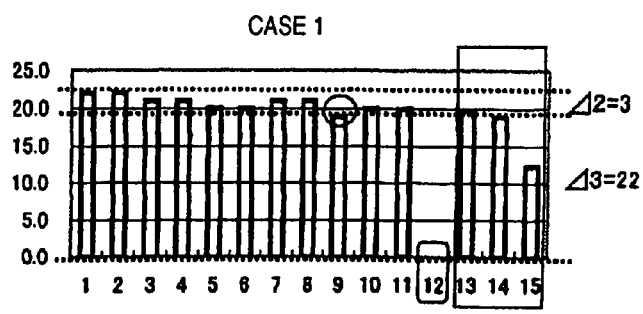

CASE 1

FIG. 20

[CASE 2] CASE WHERE TRANSMISSION CHANNEL IS IN POOR STATE AND INFLUENCE OF VARIATIONS IN NOISE IS PRESENT

| | MEASUREMENT NUMBER | CASE 2 | |
|---|---|---|---|
| | 1 | 21.0 | |
| | 2 | 21.0 | |
| | 3 | 20.0 | |
| | 4 | 20.0 | |
| | 5 | 20.0 | |
| | 6 | 19.0 | |
| | 7 | 21.0 | |
| | 8 | 22.0 | |
| | 9 | 19.0 | |
| | 10 | 0.0 | NO REPLY OR NO MEASURABLE STATE |
| | 11 | 0.0 | NO REPLY OR NO MEASURABLE STATE |
| | 12 | 0.0 | NO REPLY OR NO MEASURABLE STATE |
| | ESTIMATION METHOD 1 (13) | 19.7 | SIMPLE ESTIMATION FROM MEASUREMENT RESULT |
| | ESTIMATION METHOD 2 (14) | 15.3 | MEASUREMENT WITH GOOD PRECISION |
| | ESTIMATION METHOD 3 (15) | 9.9 | MEASUREMENT WITH BETTER PRECISION |
| ESTIMATION METHOD 1 | AVERAGE | 20.3 | CALCULATION OF AVERAGE VALUE WITHOUT CONSIDERATION OF NO REPLY OR NO MEASURABLE STATE |
| | (AVERAGE + MINIMUM)/2 | 19.7 | |
| | ESTIMATION RESULT EVAL1 | 19.7 | ESTIMATION RESULT IS USED |
| ESTIMATION METHOD 2 | AVERAGE | 15.3 | CALCULATION OF AVERAGE VALUE IN CONSIDERATION OF NO REPLY OR NO MEASURABLE STATE |
| | $\Delta 2$ | 3.0 | CALCULATION OF DIFFERENCE BETWEEN MAXIMUM VALUE AND MINIMUM VALUE OF MEASUREMENT VALUE (EXCLUDING NO REPLY) |
| | ESTIMATION RESULT EVAL2 | 15.3 | SINCE $\Delta 2$ IS SMALLER THAN 10 Mbps, RETRANSMISSION RATIO (35%) IS NOT TAKEN INTO CONSIDERATION |
| ESTIMATION METHOD 3 | AVERAGE | 15.3 | CALCULATION OF AVERAGE VALUE IN CONSIDERATION OF NO REPLY OR NO MEASURABLE STATE |
| | $\Delta 3$ | 22.0 | CALCULATION OF DIFFERENCE BETWEEN MAXIMUM VALUE AND MINIMUM VALUE OF MEASUREMENT VALUE (INCLUDING NO REPLY) |
| | ESTIMATION RESULT EVAL3 | 9.9 | SINCE $\Delta 3$ IS LARGER THAN 10 Mbps, RETRANSMISSION RATIO (35%) IS TAKEN INTO CONSIDERATION |

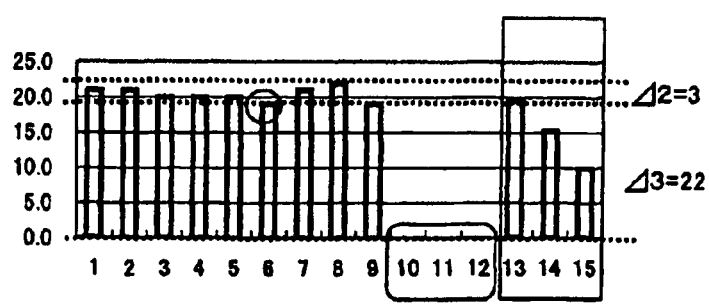

CASE 2

FIG. 21

[CASE 3] CASE WHERE TRANSMISSION CHANNEL IS IN POOR STATE BUT INFLUENCE OF VARIATIONS IN NOISE IS NOT PRESENT

| | MEASUREMENT NUMBER | CASE 3 | |
|---|---|---|---|
| | 1 | 31.0 | |
| | 2 | 32.0 | |
| | 3 | 30.0 | |
| | 4 | 32.0 | |
| | 5 | 31.0 | |
| | 6 | 30.0 | |
| | 7 | 30.0 | |
| | 8 | 32.0 | |
| | 9 | 31.0 | |
| | 10 | 32.0 | |
| | 11 | 29.0 | |
| | 12 | 31.0 | |
| | ESTIMATION METHOD 1 (13) | 30.0 | SIMPLE ESTIMATION FROM MEASUREMENT RESULT |
| | ESTIMATION METHOD 2 (14) | 30.9 | MEASUREMENT WITH GOOD PRECISION |
| | ESTIMATION METHOD 3 (15) | 30.9 | MEASUREMENT WITH BETTER PRECISION |
| ESTIMATION METHOD 1 | AVERAGE | 30.9 | CALCULATION OF AVERAGE VALUE WITHOUT CONSIDERATION OF NO REPLY OR NO MEASURABLE STATE |
| | (AVERAGE + MINIMUM)/2 | 30.0 | |
| | ESTIMATION RESULT EVAL1 | 30.0 | ESTIMATION RESULT IS USED |
| ESTIMATION METHOD 2 | AVERAGE | 30.9 | CALCULATION OF AVERAGE VALUE IN CONSIDERATION OF NO REPLY OR NO MEASURABLE STATE |
| | Δ2 | 3.0 | CALCULATION OF DIFFERENCE BETWEEN MAXIMUM VALUE AND MINIMUM VALUE OF MEASUREMENT VALUE (EXCLUDING NO REPLY) |
| | ESTIMATION RESULT EVAL2 | 30.9 | SINCE Δ2 IS SMALLER THAN 10 Mbps, RETRANSMISSION RATIO (35%) IS NOT TAKEN INTO CONSIDERATION |
| ESTIMATION METHOD 3 | AVERAGE | 30.9 | CALCULATION OF AVERAGE VALUE IN CONSIDERATION OF NO REPLY OR NO MEASURABLE STATE |
| | Δ3 | 3.0 | CALCULATION OF DIFFERENCE BETWEEN MAXIMUM VALUE AND MINIMUM VALUE OF MEASUREMENT VALUE (INCLUDING NO REPLY) |
| | ESTIMATION RESULT EVAL3 | 30.9 | SINCE Δ3 IS LARGER THAN 10 Mbps, RETRANSMISSION RATIO (35%) IS TAKEN INTO CONSIDERATION |

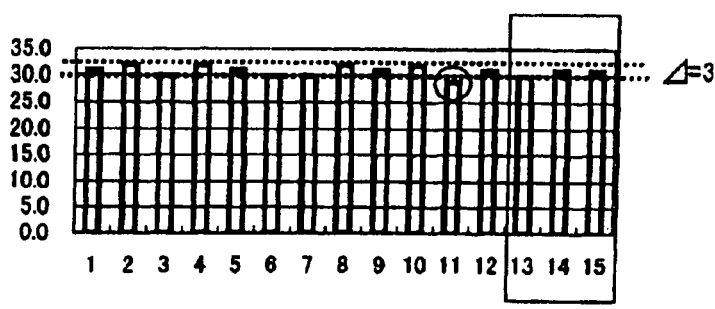

CASE 3

FIG. 22

[CASE 4] CASE WHERE TRANSMISSION CHANNEL IS IN GOOD STATE AND INFLUENCE OF VARIATIONS IN NOISE IS NOT PRESENT

|   | MEASUREMENT NUMBER | CASE 4 |   |
|---|---|---|---|
|   | 1 | 113.0 |   |
|   | 2 | 114.0 |   |
|   | 3 | 109.0 |   |
|   | 4 | 114.0 |   |
|   | 5 | 101.0 |   |
|   | 6 | 105.0 |   |
|   | 7 | 112.0 |   |
|   | 8 | 108.0 |   |
|   | 9 | 110.0 |   |
|   | 10 | 113.0 |   |
|   | 11 | 112.0 |   |
|   | 12 | 111.0 |   |
|   | ESTIMATION METHOD 1 (13) | 105.6 | SIMPLE ESTIMATION FROM MEASUREMENT RESULT |
|   | ESTIMATION METHOD 2 (14) | 71.6 | MEASUREMENT WITH GOOD PRECISION |
|   | ESTIMATION METHOD 3 (15) | 71.6 | MEASUREMENT WITH BETTER PRECISION |
| ESTIMATION METHOD 1 | AVERAGE | 110.2 | CALCULATION OF AVERAGE VALUE WITHOUT CONSIDERATION OF NO REPLY OR NO MEASURABLE STATE |
|   | (AVERAGE + MINIMUM)/2 | 105.6 |   |
|   | ESTIMATION RESULT EVAL1 | 105.6 | ESTIMATION RESULT IS USED |
| ESTIMATION METHOD 2 | AVERAGE | 110.2 | CALCULATION OF AVERAGE VALUE IN CONSIDERATION OF NO REPLY OR NO MEASURABLE STATE |
|   | $\Delta 2$ | 13.0 | CALCULATION OF DIFFERENCE BETWEEN MAXIMUM VALUE AND MINIMUM VALUE OF MEASUREMENT VALUE (EXCLUDING NO REPLY) |
|   | ESTIMATION RESULT EVAL2 | 71.6 | SINCE $\Delta 2$ IS SMALLER THAN 10 Mbps, RETRANSMISSION RATIO (35%) IS NOT TAKEN INTO CONSIDERATION |
| ESTIMATION METHOD 3 | AVERAGE | 110.2 | CALCULATION OF AVERAGE VALUE IN CONSIDERATION OF NO REPLY OR NO MEASURABLE STATE |
|   | $\Delta 3$ | 13.0 | CALCULATION OF DIFFERENCE BETWEEN MAXIMUM VALUE AND MINIMUM VALUE OF MEASUREMENT VALUE (INCLUDING NO REPLY) |
|   | ESTIMATION RESULT EVAL3 | 71.6 | SINCE $\Delta 3$ IS LARGER THAN 10 Mbps, RETRANSMISSION RATIO (35%) IS TAKEN INTO CONSIDERATION |

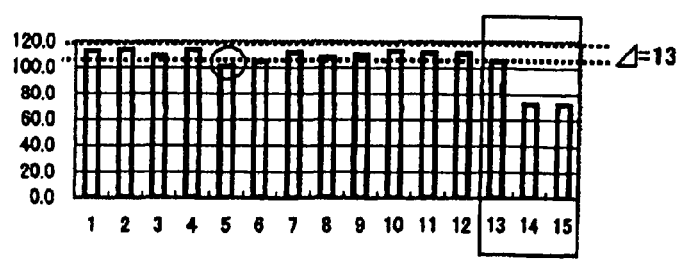

CASE 4

FIG. 23

[CASE 5] CASE WHERE TRANSMISSION CHANNEL IS IN POOR STATE AND INFLUENCE OF VARIATIONS IN NOISE IS PRESENT

| | MEASUREMENT NUMBER | CASE 5 | |
|---|---|---|---|
| | 1 | 30.0 | |
| | 2 | 22.0 | |
| | 3 | 28.0 | |
| | 4 | 15.0 | |
| | 5 | 20.0 | |
| | 6 | 28.0 | |
| | 7 | 21.0 | |
| | 8 | 29.0 | |
| | 9 | 26.0 | |
| | 10 | 29.0 | |
| | 11 | 30.0 | |
| | 12 | 18.0 | |
| | ESTIMATION METHOD 1 (13) | 19.8 | SIMPLE ESTIMATION FROM MEASUREMENT RESULT |
| | ESTIMATION METHOD 2 (14) | 16.0 | MEASUREMENT WITH GOOD PRECISION |
| | ESTIMATION METHOD 3 (15) | 16.0 | MEASUREMENT WITH BETTER PRECISION |
| ESTIMATION METHOD 1 | AVERAGE | 24.7 | CALCULATION OF AVERAGE VALUE WITHOUT CONSIDERATION OF NO REPLY OR NO MEASURABLE STATE |
| | (AVERAGE + MINIMUM)/2 | 19.8 | |
| | ESTIMATION RESULT EVAL1 | 19.8 | ESTIMATION RESULT IS USED |
| ESTIMATION METHOD 2 | AVERAGE | 24.7 | CALCULATION OF AVERAGE VALUE IN CONSIDERATION OF NO REPLY OR NO MEASURABLE STATE |
| | Δ2 | 15.0 | CALCULATION OF DIFFERENCE BETWEEN MAXIMUM VALUE AND MINIMUM VALUE OF MEASUREMENT VALUE (EXCLUDING NO REPLY) |
| | ESTIMATION RESULT EVAL2 | 16.0 | SINCE Δ2 IS SMALLER THAN 10 Mbps, RETRANSMISSION RATIO (35%) IS NOT TAKEN INTO CONSIDERATION |
| ESTIMATION METHOD 3 | AVERAGE | 24.7 | CALCULATION OF AVERAGE VALUE IN CONSIDERATION OF NO REPLY OR NO MEASURABLE STATE |
| | Δ3 | 15.0 | CALCULATION OF DIFFERENCE BETWEEN MAXIMUM VALUE AND MINIMUM VALUE OF MEASUREMENT VALUE (INCLUDING NO REPLY) |
| | ESTIMATION RESULT EVAL3 | 16.0 | SINCE Δ3 IS LARGER THAN 10 Mbps, RETRANSMISSION RATIO (35%) IS TAKEN INTO CONSIDERATION |

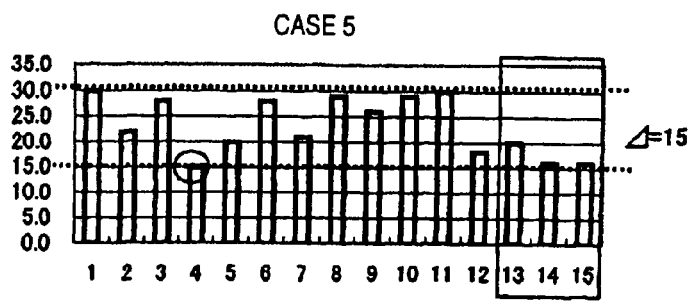

CASE 5

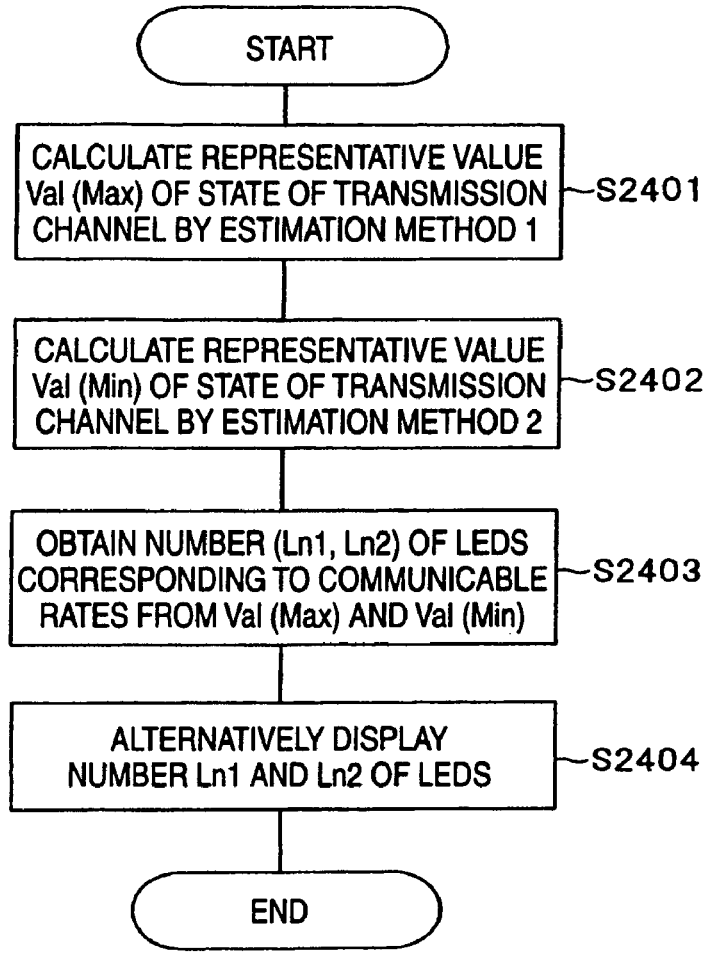

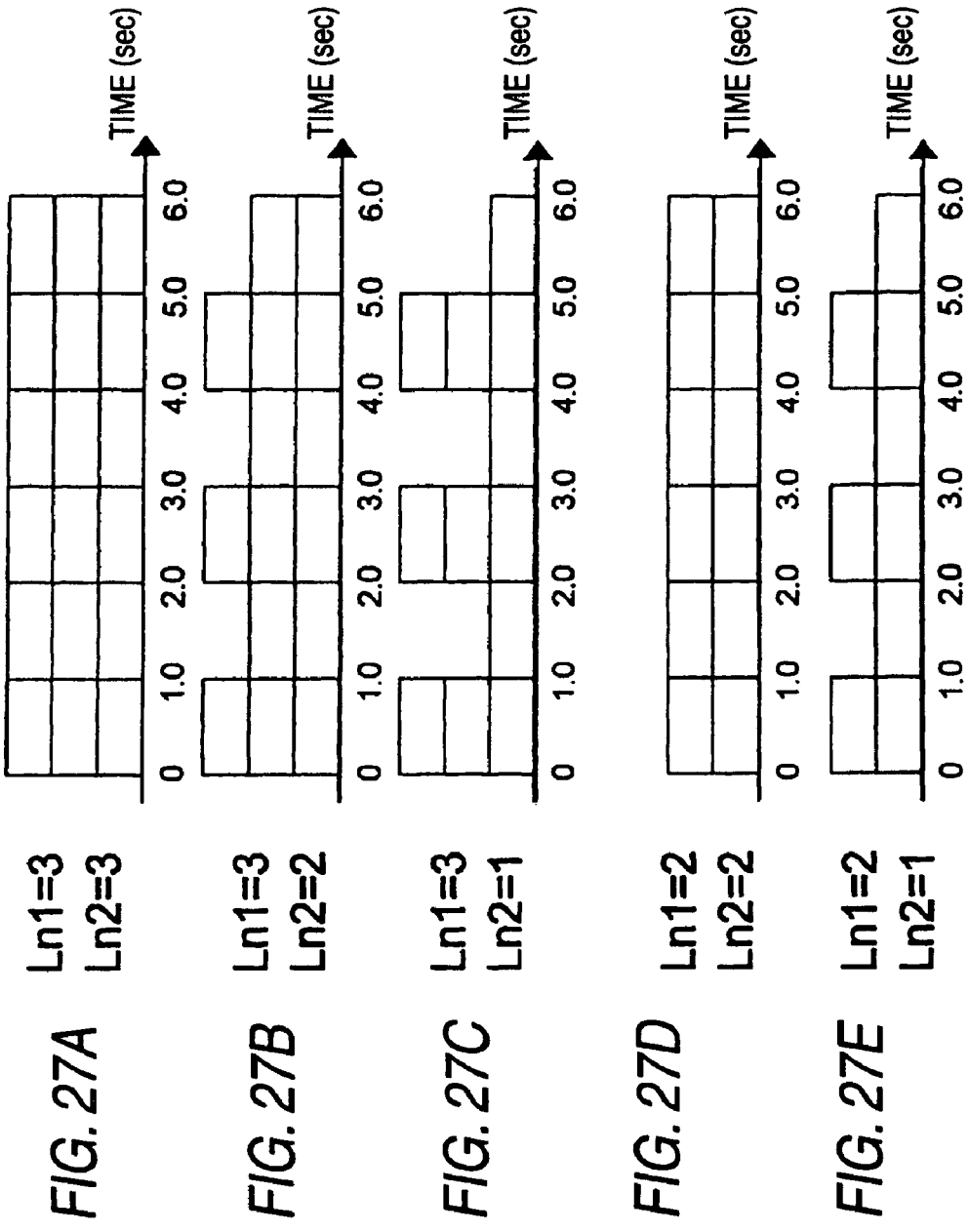

|  | MAXIMUM VALUE | MINIMUM VALUE |
|---|---|---|
| PLC1→PLC2 | Eval12 (Max) | Eval12 (Min) |
| PLC1←PLC2 | Eval21 (Max) | Eval21 (Max) |

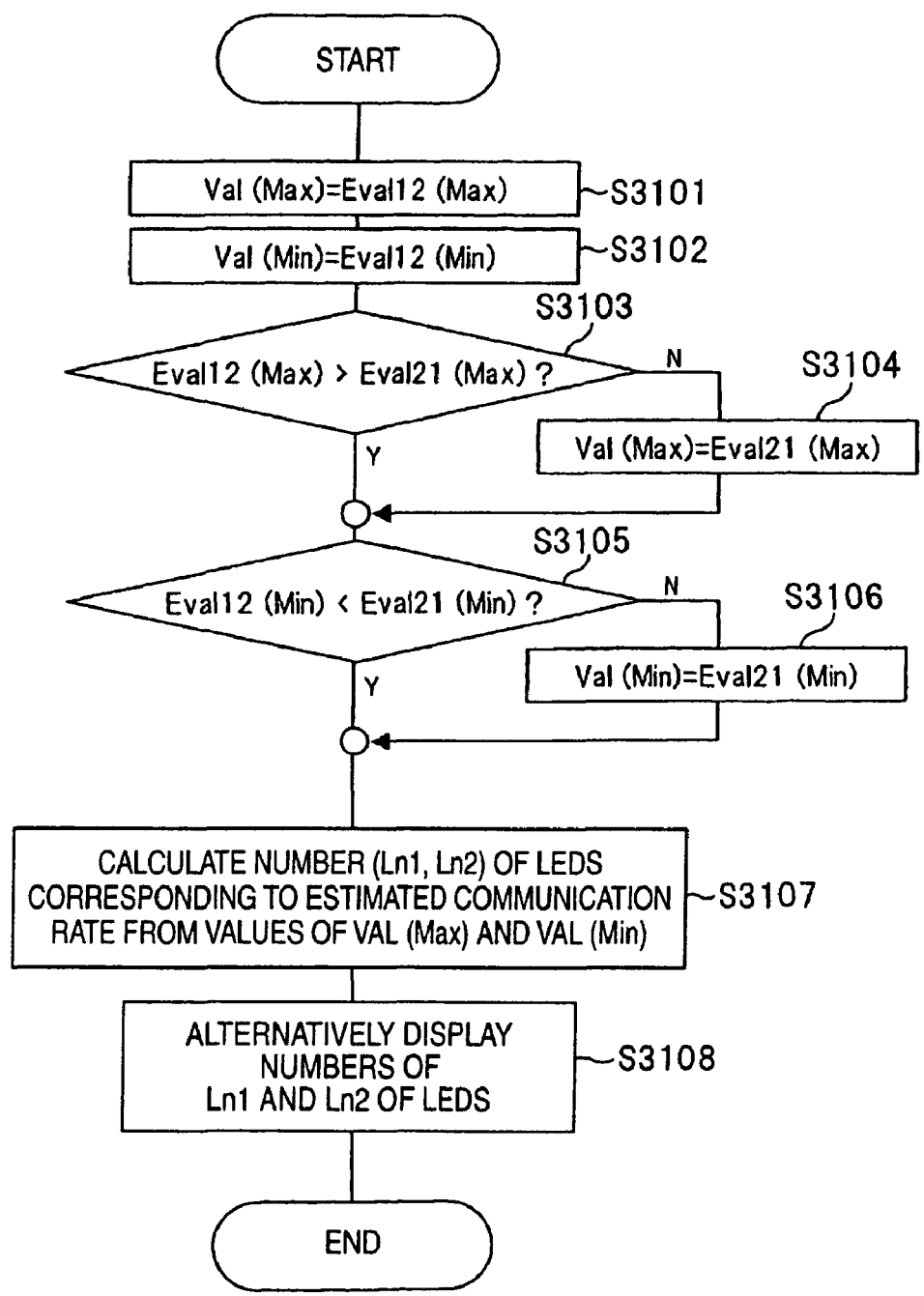

COMMUNICATION APPARATUS, COMMUNICATION SYSTEM, COMMUNICATION METHOD, INTEGRATED CIRCUIT AND CIRCUIT MODULE

BACKGROUND

1. Technical Field

The present invention relates to a communication apparatus, a communication system, a communication method, an integrated circuit and a circuit module capable of improving estimation precision of effective communication rates when the effective communication rates are estimated using the results of a transmission channel estimation performed between power line communication apparatuses without communication apparatuses for carrying out actual data communication.

2. Background Art

A communication network such as a wireless LAN or a power line communication network permits communication between a plurality of communication apparatuses. In the case of a power line communication (PLC), a PLC modem and the like can be employed as the communication apparatus. There is used a method of using a master communication apparatus carrying out network management or a method of carrying out communication between slave communication apparatuses without using the master communication apparatus. Generally, at least two communication apparatuses communicate with each other in either method. A communication performance between the two communication apparatuses depends on the state of a transmission channel (a power line in the case of the power line communication). The communication performance may deteriorate when an electrical or electronic factor such as a noise causing signal attenuation of the transmission channel exists. In a case of wireless communication, the communication performance may also deteriorate since a signal attenuates due to physical factors such as a wall blocking radio waves. As the physical factors over the power line which affect the communication performance in the power line communication, there are exemplified signal attenuation caused by reflected waves of signals generated due to branch of lines and signal attenuation caused by an connecting to another single phase wiring, that is, an (L1 phase)/(L2 phase) wiring in a distribution board collecting power lines of a house.

In a known power line communication, in order to carry out high-performance communication while miniaturizing an influence on signals, a transmission channel estimation of measuring the communication performance of the transmission channel between the communication apparatuses is performed and communication is carried out using a common transmitting and receiving tone map between the communication apparatuses on the basis of the results of the transmission channel estimation (for example, see Patent Document 1 and Patent Document 2). It is possible to obtain the theoretical best communication rate from the tone map obtained from the results of the transmission channel estimation.

Details of the transmission channel estimation performed in the known power line communication will be described with reference to FIG. 9.

FIG. 9 is a diagram illustrating a method of estimating an effective communication rate from the results of the transmission channel estimation.

In this method, the transmission channel estimation is performed plural times (twelve times), an average value of PHY rates from the results of the transmission channel estimation performed plural times is calculated, and the effective communication rate (a TCP rate or a UDP rate) is calculated from the average value of the PHY rates.

A relationship between the PHY rate and the effective communication rate has a static characteristic. Accordingly, once the PHY rate is determined, the effective communication rate is uniquely determined. In the example shown in FIG. 9, since an average PHY rate≈27 Mbps, a TCP rate≈13 Mbps and a UDP rate≈17 Mbps are estimated with reference to a predetermined relationship.

[Patent Document 1] JP-A-2005-253047
[Patent Document 2] JP-A-11-163807

However, the known power line communication has a problem in that the power line may generate a periodic noise synchronized with a commercial power supply over the power line communication network in accordance with a use environment of the power line when a specific household electronic appliance or the like is connected to the power line.

FIG. 32 is a flowchart illustrating a known estimation process of estimating the effective communication rate. In the estimation method illustrating in FIG. 32, the transmission channel estimation is performed defined plural times (N times) to obtain the plural (N) results (PHY rates) of the transmission channel estimation, while performing a timeout process of the transmission channel estimation which determines whether the results of the transmission channel estimation are returned within a predetermined period (Step S1401). Subsequently, an average value is calculated from the plural (N) PHY rates obtained in Step S1401 (Step S1402).

Subsequently, the average value of the PHY rates obtained in Step S1402 is set as the PHY rate used for the estimation of the effective communication rate (Step S1403). Finally, a practical communication rate is estimated from the PHY rate used for the estimation of the effective communication rate obtained in Step S1403 (Step S1404).

However, when a specific household electronic appliance (for example, a microwave oven, a drier, an electrical cleaner, etc.) is connected through the power line, a noise caused by the household electronic appliance may occur in the power line communication network. The periodic noise synchronized with a power frequency generally occurs.

The results (PHY rates) of the transmission channel estimation become smaller than the average value of the PHY rates, when the transmission channel estimation is performed plural times (N times) in synchronization with this noise.

Therefore, the estimation of the effective communication rate on which the noise reflects is not satisfactorily performed, since the value of the effective communication rate estimated using only the average value of the PHY rates is different from the value of the actual effective communication rate between the communication apparatuses during the occurrence of the noise.

In particular, communication is carried out on the basis of communication protocols (for example, TCP) in an actual communication apparatus (for example, a personal computer or an IP phone) connected to a device. However, the communication is carried out in accordance with the rule of restraining the effective communication rate to be low, when a loss of communication data occurs due to the noise over the transmission channel. Accordingly, when the noise occurs, there occurs a problem in that a difference between the estimation value and the measurement value of the effective communication rate become large.

In order to estimate the effective communication rate on which the periodic noise reflects, timing at which the transmission channel estimation is performed is also important. In the known transmission channel estimation, the values of the PHY rates obtained by the transmission channel estimation did not sufficiently reflect the occurrence of the periodic noise, since the transmission channel estimation is performed at timing which does not related to timing at which the periodic noise occurs.

A location (outlet) where the power line communication apparatus is connected is important in construction of the power line communication network. A construction work of the power line communication network is facilitated when the effective communication rate between the power line communication apparatuses is estimated precisely in advance before the construction of the power line communication network.

SUMMARY

According to an aspect of the invention, there is provided a communication apparatus which transmits data to another communication apparatus through a transmission channel, the communication apparatus including: a display which displays a plurality of communication rates; and a controller which acquires a first communication rate which is received from the another communication apparatus and is based on a predetermined signal transmitted to the another communication apparatus through the transmission channel at a first time, and acquires a second communication rate which is received from the another communication apparatus and is based on a predetermined signal transmitted to the another communication apparatus through the transmission channel at a second time, wherein the controller calculates a plurality of communication rates on the basis of the first communication rate and the second communication rate, and wherein the controller permits the display to display the plurality of the communication rate when a difference between the plurality of communication rates is larger than a predetermined value According to another aspect of the invention, there is provided a communication system in which a first communication apparatus and a second communication apparatus transmit data one another through a transmission channel, wherein the first communication apparatus includes: a display which displays a plurality of communication rates; and a first controller which acquires, from a first communication unit, a first communication rate which is received from the another communication apparatus and is based on a predetermined signal transmitted to the another communication apparatus through the transmission channel at a first time, and a second communication rate which is received from the another communication apparatus and is based on a predetermined signal transmitted to the another communication apparatus through the transmission channel at a second time, calculates a plurality of communication rates on the basis of the first communication rate and the second communication rate, and permits the display to display the plurality of communication rates when a difference between the plurality of communication rates is larger than a predetermined value, and wherein the second communication apparatus includes: a second communication unit which receives data as a signal from the first communication apparatus; and a second controller which transmits information which is based on a difference between the predetermined signal and the received predetermined signal.

According to another aspect of the invention, there is provided a communication method of transmitting data through a transmission channel by a first communication apparatus and a second communication apparatus, the method including: transmitting a first predetermined signal at a first time to the second communication apparatus through the transmission channel by the first communication apparatus; receiving the first predetermined signal from the first communication apparatus by the second communication apparatus; transmitting a first communication rate which is based on a difference between the first predetermined signal and the first received predetermined signal by the second communication apparatus; transmitting a second predetermined signal at a second time differed from the first time to the second communication apparatus through the transmission channel by the first communication apparatus; receiving the second predetermined signal from the first communication apparatus by the second communication apparatus; transmitting a second communication rate which is based on a difference between the second predetermined signal and the second received predetermined signal by the second communication apparatus; calculating a plurality of communication rates on the basis of the first communication rate and the second communication rate; and displaying the plurality of communication rate when a difference between the plurality of communication rates is larger than a predetermined value.

According to another aspect of the invention, there is provided an integrated circuit, including: a communication unit which communicates data as a signal with a plurality of other communication apparatuses connected to a transmission channel via a coupler interfacing the transmission channel; and a controller which acquires, from the communication unit, a first communication rate which is received from the another communication apparatus and is based on a predetermined signal transmitted to the another communication apparatus through the transmission channel at a first time, and a second communication rate which is received from the another communication apparatus and is based on a predetermined signal transmitted to the another communication apparatus through the transmission channel at a second time, wherein the controller calculates the plurality of communication rates on the basis of the first communication rate and the second communication rate, and wherein the controller outputs the plurality of communication rates when a difference between the plurality of communication rates is larger than a predetermined value.

According to another aspect of the invention, there is provided a circuit module, including: a coupler which interfaces a transmission channel; a communication unit which communicates data as a signal with a plurality of other communication apparatuses connected to the transmission channel via the coupler; and a controller which acquires, from the communication unit, a first communication rate which is received from the another communication apparatus and is based on a predetermined signal transmitted to the another communication apparatus through the transmission channel at a first time, and a second communication rate which is received from the another communication apparatus and is based on a predetermined signal transmitted to the another communication apparatus through the transmission channel at a second time, wherein the controller calculates a plurality of communication rates on the basis of the first communication rate and the second communication rate, and wherein the controller permits the display to display the plurality of the communication rate when a difference between the plurality of communication rates is larger than a predetermined value.

According to the invention, a communication apparatus acquires a first communication rate obtained by transmitting predetermined data through a transmission channel at first time and a second communication rate obtained by transmitting predetermined data through the transmission channel at second time. When the second communication rate is smaller than the first communication rate, an effective communication rate of the data is estimated using the second communication rate. Accordingly, the effective communication rate on which a noise occurring over the transmission channel reflects can be estimated.

BRIEF DESCRIPTION OF THE DRAWINGS

The above advantages of the present invention will become more apparent by describing in detail preferred exemplary embodiments thereof with reference to the accompanying drawings, wherein like reference numerals designate like or corresponding parts throughout the several views, and wherein:

FIG. 7 is a characteristic diagram used in estimation of a communication performance from the results of a transmission channel estimation.

FIG. 8 is a diagram illustrating an influence of a transmission channel noise on communication.

FIG. 9 is a diagram illustrating a method of estimating an effective communication rate from the results of the transmission channel estimation.

FIG. 10B is a flowchart illustrating the transmission channel estimation performed by a transmission side in detail.

FIG. 10C is a flowchart illustrating the transmission channel estimation performed by a reception side in detail.

FIG. 11 is a diagram illustrating the result of a simulation determining whether to detect the periodic noise caused by a difference of start timing of the transmission channel estimation.

FIG. 12A is a diagram illustrating a relationship between detection of the periodic noise and offset time of the timing at which the transmission channel estimation is performed in case that a power frequency is 60 Hz.

FIG. 12B is a diagram illustrating a relationship between detection of the periodic noise and offset time of the timing at which the transmission channel estimation is performed in case that a power frequency is 50 Hz.

FIG. 19 is a diagram illustrating as Case 1 Calculation Example 1 of the results of the transmission channel estimation performed when the transmission channel is in a poor state and thus the variations of a noise affect the transmission channel.

FIG. 20 is a diagram illustrating as Case 2 Calculation Example 2 of the results of the transmission channel estimation performed when the transmission channel is in a poor state and thus the variations of a noise affect the transmission channel.

FIG. 21 is a diagram illustrating as Case 3 a calculation example of the results of the transmission channel estimation performed when the transmission channel is not in a good state but the variations in a noise do not affect the transmission channel.

FIG. 22 is a diagram illustrating as Case 4 a calculation example of the results of the transmission channel estimation performed when the transmission channel is in a good state and thus the variations in a noise do not affect the transmission channel.

FIG. 23 is a diagram illustrating as Case 5 Calculation Example 3 of the results of the transmission channel estimation performed when the transmission channel is in a poor state and thus the variations of a noise affect the transmission channel.

FIG. 24 is a flowchart illustrating a process sequence of a method of indicating the results of the transmission channel estimation according to a third embodiment.

FIG. 25 is a diagram illustrating an indication example of the communication rates on LEDs of an display.

FIGS. 27A to 27E are diagrams illustrating examples of alternatively expressing the results of the transmission channel estimation obtained by Estimation Method 1 and Estimation Method 2 in the form of time-series.

FIG. 31 is a flowchart illustrating a process sequence of a method of indicating the results of the transmission channel estimation according to the fourth embodiment.

DETAILED DESCRIPTION

First Embodiment

Hereinafter, an embodiment of the invention will be described with reference to the drawings.

Figure 1:
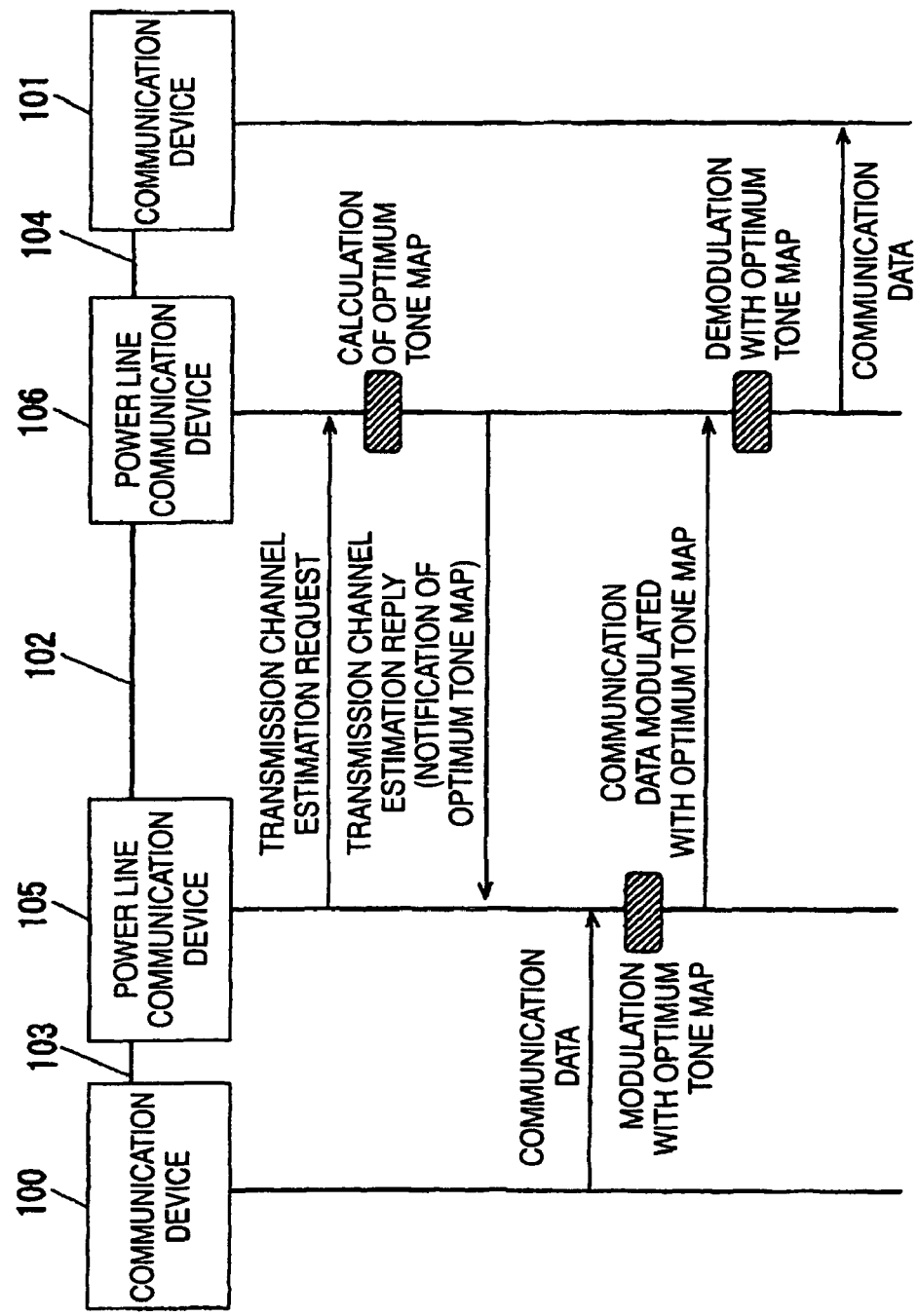
FIG. 1 is an explanatory diagram illustrating a process in which a communication apparatus transmits communication data to another communication apparatus through a transmission channel.

FIG. 1 is an explanatory diagram illustrating a process in which a communication apparatus transmits communication data to another communication apparatus through a transmission channel. A communication apparatus 100 is connected to a power line communication apparatus 105 through a transmission channel 103. A communication apparatus 101 is connected to a power line communication apparatus 106 through a transmission channel 104. The communication apparatuses 100 and 101 are personal computers or IP phones, for example. In addition, the power line communication apparatuses 105 and 106 and the communication apparatuses 100 and 101 may be configured as individual devices, respectively, and may be configured as an integrated device, respectively. The transmission channels 103 and 104 may be configured as wireless lines or wired lines. In the case of the wired lines, an Ethernet (registered trademark) cable, a coaxial cable, or the like can be taken into consideration. In addition, the transmission channels 103 and 104 may be configured to carry out wireless communication. In this embodiment, the Ethernet (registered trademark) cable is used as the transmission channels 103 and 104.

The power line communication apparatuses 105 and 106 are connected to each other through a transmission channel 102. In this embodiment, a power line is used as the transmission channel 102.

The power line communication apparatus 105 transmits a transmission channel estimation request to the power line communication apparatus 106, when the communication apparatus 100 transmits communication data to the communication apparatus 101. The power line communication apparatus 106 receiving the transmission channel estimation request calculates a tone map, transmits an optimum tone map as a reply to the power line communication apparatus 105, and stores the optimum tone map therein. The power line communication apparatus 105 receiving the optimum tone map from the power line communication apparatus 106 modulates the communication data transmitted from the communication apparatus 100 using the optimum tone map and transmits the modulated communication data to the power line communication apparatus 106 through the transmission channel 102. The power line communication apparatus 106 demodulates the communication data using the optimum tone map and transmits the demodulated communication data to the communication apparatus 101.

Figure 2:
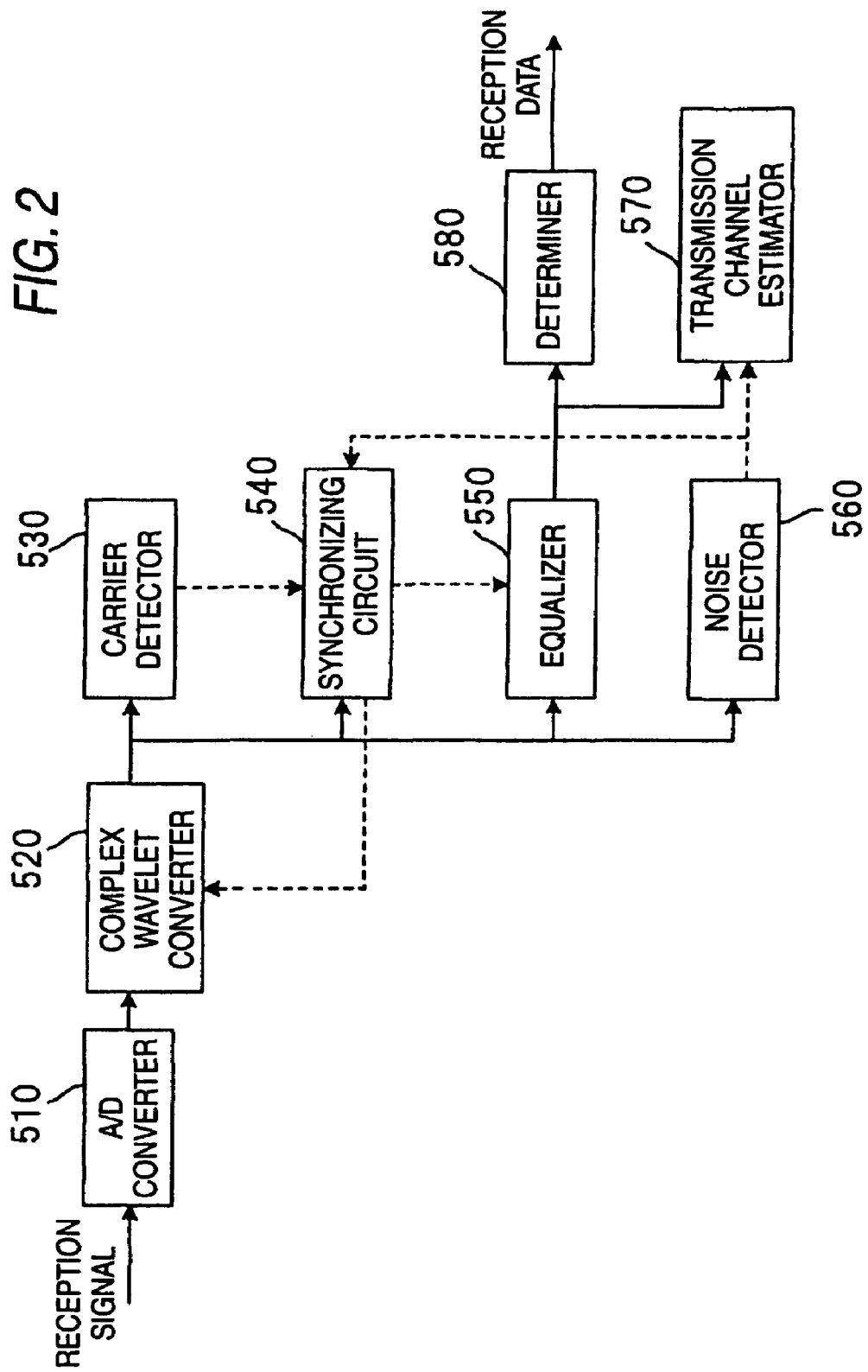
FIG. 2 is a block diagram illustrating a receiver of a power line communication apparatus according to an embodiment of the invention.

FIG. 2 is a block diagram illustrating a receiver of the power line communication apparatus 106 according to this embodiment of the invention. In addition, the power line communication apparatus 105 transmits a signal.

In FIG. 2, an A/D converter 510 converts an analog signal into a digital signal. A complex wavelet converter 520 performs wavelet transform on a reception signal to generate an in-phase signal and a quadrature signal. A carrier detector 530 detects a transmission signal transmitted from a transmission device. A synchronizing circuit 540 synchronizes the reception signal. An equalizer 550 corrects a distorted signal caused due to an influence of the transmission channel. A noise detector 560 detects whether a narrowband noise is present in each sub-carrier band using the signal subjected to the complex wavelet transform. A transmission channel estimator 570 determines a primary modulation used in each sub-carrier of a symbol mapper in the transmission device using a signal output from the equalizer 550 and information on whether the narrowband noise output from the noise detector is present. A determiner 580 performs a determination process using the signal output from the equalizer 550.

An operation of the receiver of the power line communication apparatus 106 configured in this manner will be described with reference to FIGS. 1 to 3.

Upon transmitting the transmission channel estimation request, the power line communication apparatus 105 transmits to the power line communication apparatus 106 one frame having a structure for containing a signal for the transmission channel estimation request and a signal using all carriers.

In FIG. 2, the A/D converter 510 converts the analog reception signal into a digital signal and the complex wavelet converter 520 performs the wavelet transform on the received digital signal. The carrier detector 530 detects a signal transmitted from the power line communication apparatus 105 and the synchronizing circuit 540 adjusts wavelet transform timing of the complex wavelet converter 520 to synchronize with the reception signal using a preamble signal. The equalizer 550 eliminates an influence on the transmission channel and the noise detector 560 detects the narrowband noise present in a usable band. The transmission channel estimator 570 estimates states of the transmission channel to determine a primary modulation method of the symbol mapper used in the transmission device and the determiner 580 performs the determination process using a signal output from the equalizer 550.

Figure 3:
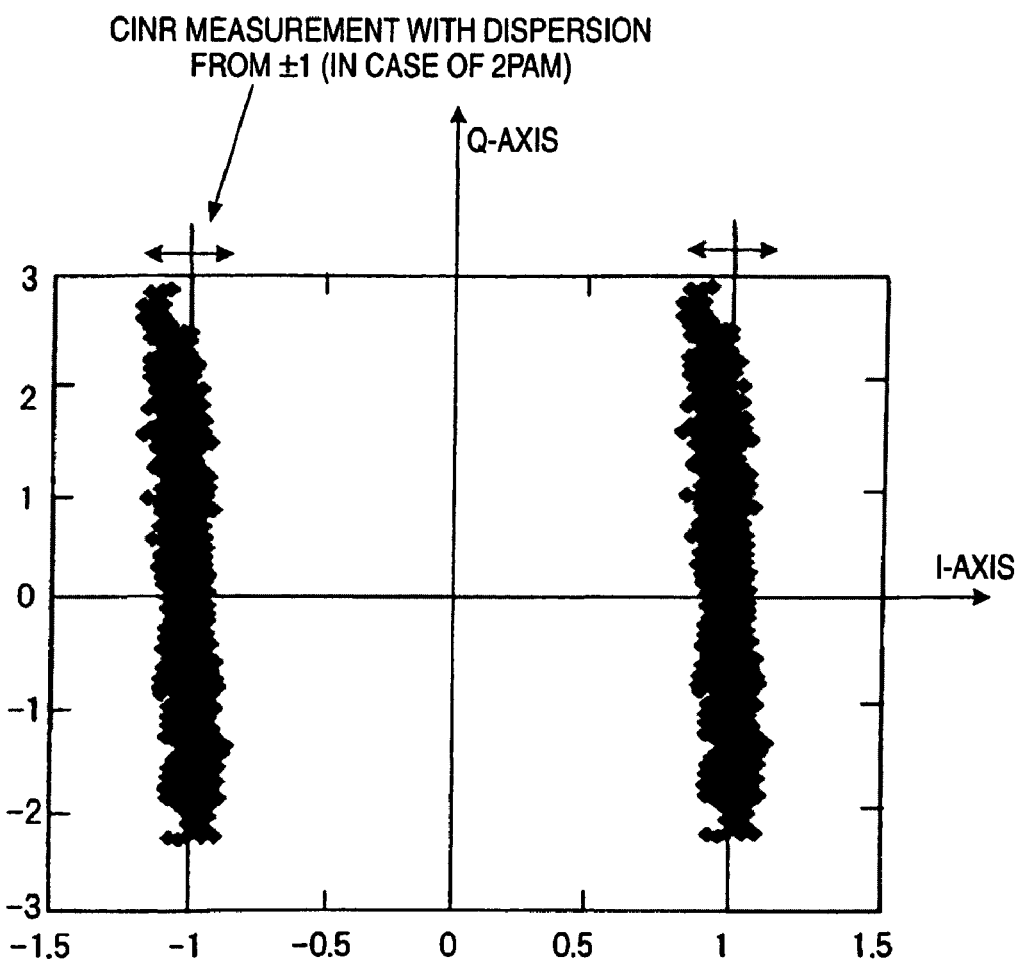
FIG. 3 is a diagram illustrating a scatter of a signal output from an equalizer in the receiver.

FIG. 3 is a diagram illustrating a scatter of the signal output from the equalizer of the receiver. In FIG. 3, the scatter (for all sub-carriers) output from the equalizer of the receiver is shown when all sub-carriers 2PAM are selected using the symbol mapper of the transmission device. Upon performing a normal transmission channel estimation, the power line communication apparatus 105 transmits a signal formed by modulating all the sub-carriers in a frame for the transmission channel estimation request by 2PAM. The transmission channel estimator 570 of the power line communication apparatus 106 measures a CINR (Carrier power to (Interference-plus-Noise) power Ratio) as an amount of noise with dispersion from signal point arrangement (in case of 2PAM±1). The transmission channel estimator 570 selects the primary modulation (for example, 16PAM, 8PAM, etc.), which is used in each sub-carrier, using the CINR measured in each sub-carrier and notifies the power line communication apparatus 105. Such a process is the transmission channel estimation normally performed in a transceiver device.

Here, a map formed by corresponding communication rates determined by types of the primary modulation of each sub-carrier with each sub-carrier is the tone map.

The power line communication apparatus 105 generates the transmission channel estimation request and waits a reply from the power line communication apparatus 106 until timeout. When the reply is notified, a notified new tone map is stored in a transmission channel result storage 340b which is described below. Alternatively, when the reply is not notified from the power line communication apparatus 106, a previous tone map is used. In addition, when the reply is not notified, the result of communication performance measurement is recorded as measurement failure, that is, PHY rate=0. This result is treated as one of statistics processing data of the PHY rates, which is described below. The PHY rate refers to the maximum communication rate at which actual data can be transmitted through the transmission channel. As well as the power line, a coaxial cable and other pair wires may be used as the transmission channel 102.

Figure 4A:
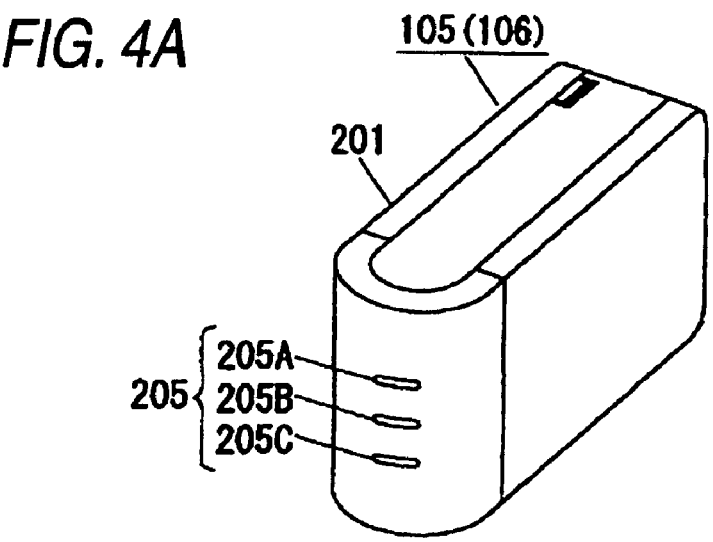
FIG. 4A is a perspective view illustrating the appearance of the power line communication apparatus.
Figure 4B:
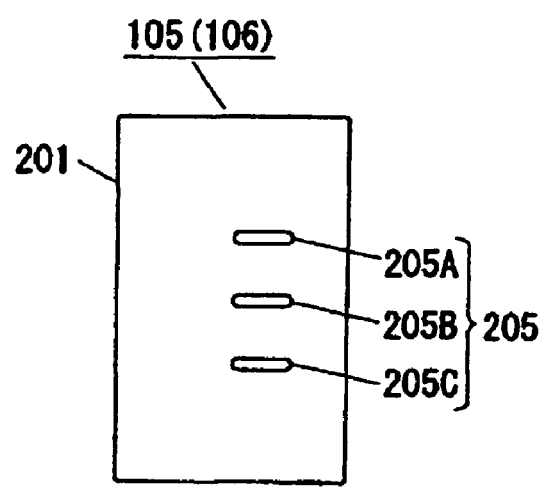
FIG. 4B is a front view illustrating the appearance of the power line communication apparatus.
Figure 4C:
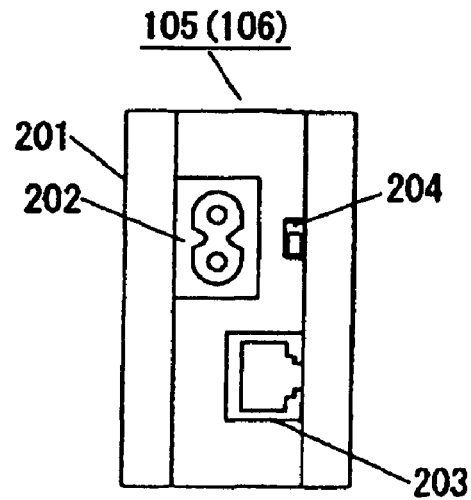
FIG. 4C is a rear view illustrating the appearance of the power line communication apparatus.

FIGS. 4A to 4C are diagrams illustrating the appearances of the power line communication apparatus 105 (106). FIG. 4A is a perspective view illustrating the appearance of the power line communication apparatus. FIG. 4B is a front view illustrating the appearance of the power line communication apparatus. FIG. 4C is a rear view illustrating the appearance of the power line communication apparatus. The power line communication apparatus 105 (106) shown in FIGS. 4A to 4C includes a casing 201. As shown in FIGS. 4A and 4B, a display 205 which includes LEDs (Light Emitting Diodes) 205A, 205B, and 205C is formed on a front surface of the casing 201. As shown in FIG. 4C, a power connector 202, a LAN (Local Area Network) modular jack 203 such as a RJ 45 and a switch 204 for switching operation modes or the like are formed on a rear surface of the casing 201. A power cable (not shown in FIGS. 4A to 4C) is connected to the power connector 202 and a LAN cable (not shown in FIGS. 4A to 4C) is connected to the modular jack 203. In addition, in the power line communication apparatus 105 (106), a Dsub (D-subminiature) connector may further be provided to connect with a Dsub cable. Of course, a known connector or the like may be provided. In addition, one LED capable of expressing colors may be used instead of the plural LEDs, and the communication rate or the like may be displayed on a liquid crystal display or an EL display.

Figure 5:
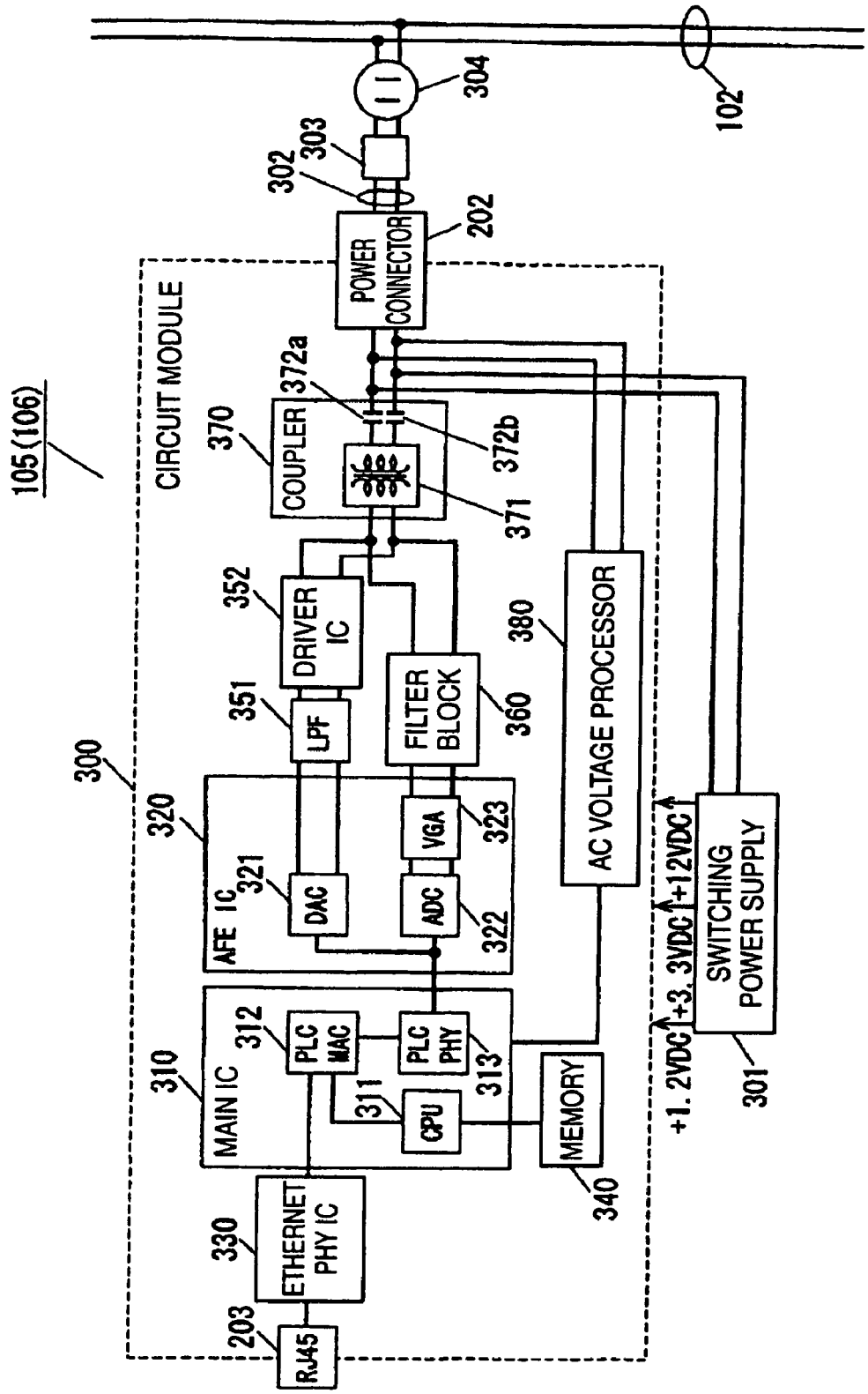
FIG. 5 is a block diagram illustrating a hardware example of the power line communication apparatus.

FIG. 5 is a block diagram illustrating a hardware example of the power line communication apparatus 105 (106). As shown in FIG. 5, the power line communication apparatus 105 (106) includes a circuit module 300 and a switching power supply 301. The switching power supply 301 supplies various types (for example, +1.2 V, +3.3 V, or +12 V) of voltage to the circuit module 300 and is configured to include a switching transformer and a DC-DC converter (which are all not shown), for example.

The circuit module 300 includes a main IC (Integrated Circuit) 310, an AFC IC (Analog Front END Integrated Circuit) 320, an Ethernet (registered trademark) PHY IC (Physical layer Integrated Circuit) 330, a memory 340, a lowpass filter (LPF) 351, a driver IC 352, a bandpass filter (BPF) 360, and a coupler 370. The switching power supply 301 and the coupler 370 are connected to a power connector 202 and also connected to the transmission channel 102 via a power cable 302, a power plug 303, and an outlet 304. A main IC 310 functions as a control circuit which carries out a power line communication.

The main IC 310 includes a CPU (Central Processor) 311, a PLC MAC (Power Line Communication Media Access Control layer) block 312, and a PLC PHY (Power Line Communication Physical layer) block 313. The CPU 311 is mounted with a 32-bit RISC (Reduced Instruction Set Computer) processor. The PLC MAC block 312 manages a MAC layer (Media Access Control layer) of a transmission signal and a reception signal and PLC PHY block 313 manages a PHY layer (Physical layer) of the transmission signal and the reception signal. The AFE IC 320 includes a DA converter (DAC: D/A converter) 321, an AD converter (ADC: A/D converter) 322, and a variable gain amplifier (VGA: Variable Gain Amplifier) 323. The coupler 370 includes a coil transformer 371 and coupling capacitors 372a and 372b. In addition, the CPU 311 controls operations of the PLC MAC block 312 and the PLC PHY block 313 using data stored in the memory 311 and also controls the power line communication apparatus 105 (106) as a whole.

Communication carried out between the power line communication apparatus 105 (106) is carried out as follows. That is, the communication data of the communication apparatuses 100 and 101 which are input from the modular jack 203 are transmitted to the main IC 310 through the Ethernet (registered trademark) PHY IC 330, and a digital transmission signal is generated by digital signal processing. The generated digital transmission signal is converted into an analog signal by the DA converter (DAC) 321 of the AFE IC 320 and output to the transmission channel 102 via the lowpass filter 351, the driver IC 352, the coupler 370, the power connector 202, the power cable 302, the power plug 303, and the outlet 304.

The signal received from the transmission channel 102 is transmitted to the bandpass filter 360 via the coupler 370, is gain-adjusted by the variable gain amplifier (VGA) 323 of the AFE IC 320, and is converted into a digital signal by the AD converter (ADC) 322. The converted digital signal is transmitted to the main IC 310 and converted into digital data by the digital signal processing. The converted digital data are output from the modular jack 203 via the Ethernet (registered trademark) PHY IC 330.

The power line communication apparatus 105 (106) carries out multi-carrier communication using plural sub-carriers by an OFDM (Orthogonal Frequency Division Multiplexing) method or the like. The digital process of converting transmission data into an OFDM transmission signal and converting an OFDM reception signal into reception data is performed mainly by PLC PHY block 313.

An AC voltage processor 380 is connected to a transmission channel between the power connector 202 and the coupler 370 and also connected to a zero cross point detection circuit 401 provided in the main IC 310, which is described below. The AC voltage processor 380 performs analog signal processing of AC voltage necessary for operations of the zero cross point detection circuit 401.

Figure 6:
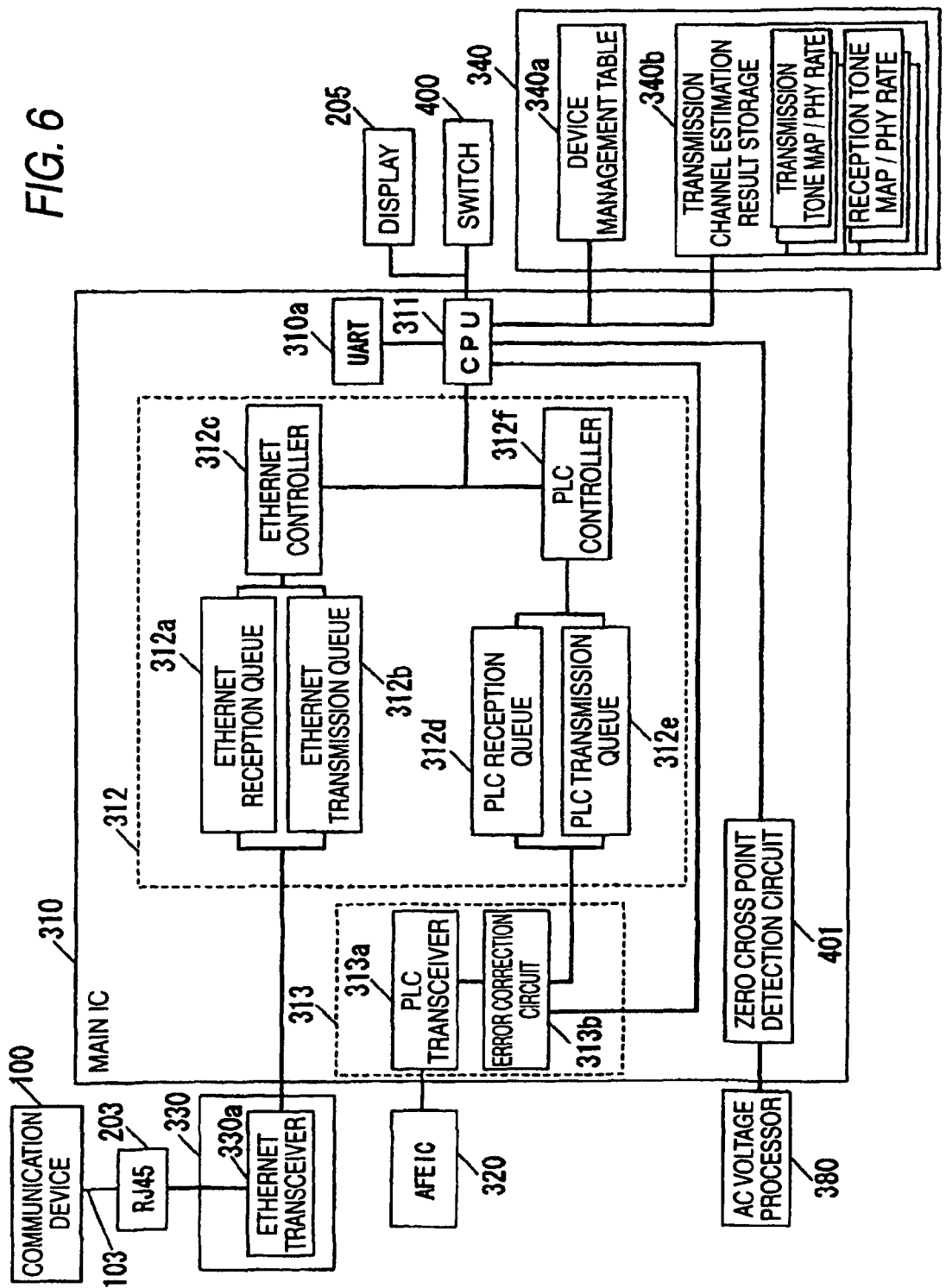
FIG. 6 is a block diagram illustrating the vicinity of a main IC in detail.

FIG. 6 is a block diagram illustrating the vicinity of the main IC in detail. The configuration of the power line communication apparatus 105 shown in FIG. 6 is the same as that of the power line communication apparatus 106. Here, the power line communication apparatus 105 will be described as an example.

The main IC 310 further includes the zero cross point detection circuit 401 and a UART (Universal Asynchronous Receiver Transmitter) 310a in addition to the CPU 311, the PLC MAC block 312, and the PLC PHY block 313 described above. The CPU 311 also manages the zero cross point detection circuit 401 and the UART 310a. The zero cross point detection circuit 401 detects a zero cross point (or a point in the vicinity of the zero cross point) of voltage in AC power waveforms of a commercial power supply supplied to the transmission channel 102, that is, in an AC waveform consisting of sine waves of 50 Hz or 60 Hz. The zero cross point detection circuit is connected to the AC voltage processor 380. The transmission channel estimation is performed in synchronization with the zero cross point (or the point in the vicinity of the zero cross point). The UART 310a is a type of a serial interface and is connected to an external device (for example, a personal computer or the like). The UART 310a converts a parallel signal transmitted from the CPU 311 into a serial signal and has a function converting the serial signal transmitted from the external device into a parallel signal.

The Ethernet (registered trademark) PHY IC 330 includes an Ethernet (registered trademark) transceiver 330a. The Ethernet (registered trademark) transceiver controls communication between the power line communication apparatus 105 and the communication apparatus 100. A relationship between the power line communication apparatus 106 and the communication apparatus 101 is the same as the relationship between the power line communication apparatus 105 and the communication apparatus 100.

The memory 340 includes a device management table 340a and a transmission channel estimation result storage 340b. Specifically, a flash memory or the like is used as the memory 340. The device management table 340a stores information (a MAC addresses and an ID of the power line communication apparatus of a communication opponent) on another power line communication apparatus connected to a power line communication network. The transmission channel estimation result storage 340b stores a transmission tone map, a transmission PHY rate, a reception tone map, and a reception PHY rate.

Here, the transmission tone map refers to a tone map which is calculated by the power line communication apparatus 105 receiving the transmission channel estimation request in reply to the transmission channel estimation request from the power line communication apparatus 106 of the communication opponent. The transmission PHY rate refers to a PHY rate of data transmitted from the power line communication apparatus 106 of the communication opponent. The transmission PHY rate is calculated simultaneously along with the transmission tone map by the power line communication apparatus 105 receiving the transmission channel estimation request. The transmission tone map and the transmission PHY rate are transmitted to the power line communication apparatus 106 of the communication opponent and also stored in the power line communication apparatus 105 receiving the transmission channel estimation request. The transmission tone map and the transmission PHY rate transmitted to the power line communication apparatus 106 of the communication opponent are stored as the reception tone map and the reception PHY rate in the power line communication apparatus 106 of the communication opponent. The transmission tone map and the transmission PHY rate are calculated by the CPU 311. The calculated transmission tone map and the transmission PHY rate are stored in the transmission channel estimation result storage 340b by the CPU 311.

The switch 400 is provided to instruct the start of the transmission channel estimation between the power line communication apparatuses 105 and 106. When the switch 400 is turned on, a signal for starting the transmission channel estimation is transmitted to the CPU 311. When recognizing the signal, the CPU 311 performs the transmission channel estimation request to transmit the frame for the transmission channel estimation request to the power line communication apparatus 106.

A unit of starting the transmission channel estimation is not limited to the above-described switch. For example, when the power plug 303 is inserted into the outlet 304, the transmission channel estimation may simultaneously be started.

The PLC MAC block 312 includes an Ethernet (registered trademark) reception queue 312a, an Ethernet (registered trademark) transmission queue 312b, an Ethernet (registered trademark) controller 312c, a PLC reception queue 312d, a PLC transmission queue 312e, and a PLC controller 312f.

The PLC PHY block 313 includes a PLC transceiver 313a and an error correction circuit 313b.

The Ethernet (registered trademark) reception queue 312a sequentially stores the communication data received from the communication apparatus 100 (101). The previous stored communication data are first transmitted to the PLC transmission queue 312e by the Ethernet (registered trademark) controller 312f and is stored in the PLC transmission queue 312e. The previously stored communication data in the PLC transmission queue 312e is first transmitted to the PLC PHY block 313 by the PLC controller 312f.

Additional data (error correction code) are appended to the communication data transmitted from the PLC transmission queue 312e to the PLC PHY block 313 by the error correction circuit 313b. The reason for appending the error correction code is to detect errors of the communication data from the error correction code appended in advance to the communication data to correct the errors of the communication when a transmission failure occurs due to a noise present over the transmission channel 102.

The communication data to which the error correction code is appended by the error correction circuit 313b is transmitted to the PLC transceiver 313a.

The PLC transceiver 313a modulates the communication data. The modulation is performed on the basis of the above-described transmission (reception) tone map. The modulated communication data is transmitted to the AFE IC 320.

The PLC transceiver 313a demodulates the communication data transmitted from the AFE IC 320. The demodulation is performed on the basis of the above-described transmission (reception) tone map. The demodulated communication data is transmitted to the error correction circuit 313b. The error correction circuit 313b corrects errors of the communication data. The corrected communication data is transmitted to the PLC MAC block 312. The PLC reception queue 312d sequentially stores the communication data processed by the PLC PHY block 313. The PLC controller 312f first transmits the communication data stored in the PLC reception queue 312 to the Ethernet (registered trademark) transmission queue 312b in an earlier stored order. The Ethernet (registered trademark) controller 312c first transmits the communication data stored in the Ethernet (registered trademark) transmission queue 312b to the Ethernet (registered trademark) PHY IC 330 in an earlier stored order.

Next, a method of estimating the communication performance from the results of the transmission channel estimation will be described. Here, a case where the power line communication apparatus 105 receives the frame for the transmission channel estimation request from the power line communication apparatus 106 will be described. In addition, the configuration of the power line communication apparatus 105 is the same as that of the power line communication apparatus 106.

The power line communication apparatus 105 calculates the PHY rates when receiving the frame for the transmission channel estimation request. When the frame for the transmission channel estimation request is transmitted through the transmission channel 102, the frame for the transmission channel estimation request affected by the noise or impedance present over the transmission channel 102 is received by the power line communication apparatus 105. The PHY rate is obtained theoretically using the frame for the transmission channel estimation request affected by the noise or the impedance over the transmission channel 102.

FIG. 7 is a characteristic diagram used for estimation of the communication performance from the results of the transmission channel estimation. A horizontal axis indicates an amount (dB) of signal attenuation of the power line communication apparatus 105 and a vertical axis indicates the communication rate (Mbps). The characteristic diagram shows a relationship between an attenuation characteristic and the PHY rate, a relationship between the attenuation characteristic and the UDP rate, and a relationship between the attenuation characteristic and the TCP rate. The TCP rate is treated as an effective communication rate.

The TCP rate is the maximum communication rate at which communication can be carried out without a loss of data when the plural communication apparatuses are connected to each other through the power line communication apparatuses and TCP (Transmission Control Protocol) connection is established between the communication apparatuses.

The UDP rate is the maximum communication rate at which communication can be carried out without the loss of data when the plural communication apparatuses are connected to each other through the power line communication apparatuses and UDP (User Datagram Protocol) connection is established between the communication apparatuses.

In this embodiment, since the communication protocol of a TCP is used, the TCP rate is used as the effective communication rate. In addition, when communication protocol of a UDP is used, the UDP rate is used as the effective communication rate.

The power line communication apparatus 105 stores the characteristic diagram in the memory 340. The relationship between the PHY rate and the UDP rate and the relationship between the PHY rate and the TCP rate have a static characteristic, respectively. Accordingly, the CPU 311 can measure the UDP rate and the TCP rate with reference to this characteristic diagram when the PHY rate is theoretically obtained by the transmission channel estimation.

For example, in Case [2], the PHY rate≈50 Mbps and thus it is estimated that the TCP rate≈30 Mbps. In Case [1], the PHY rate≈10 Mbps and thus it is estimated that TCP rate≈8 Mbps. However, the invention is not limited to the above-described characteristic diagram. A function among the PHY rate, the TCP rate, and the UDP rate may be defined and the function may be stored in the memory 340 to estimate the effective communication rate. In addition, a relationship among the PHY rate, the TCP rate, and the UDP rate may be expressed in a table and the table may be stored in the memory 340 to estimate the effective communication rate.

By this method, it is possible to estimate the effective communication rate between the power line communication apparatuses 105 and 106, even when actual communication is not carried out between the communication apparatuses 100 and 101.

FIG. 8 is a diagram illustrating an influence of the transmission channel noise on communication. Two types of power frequency used in Japan are 50 Hz and 60 Hz. A half cycle of 50 Hz is about 10 msec and a half cycle of 60 Hz is about 8.3 msec. A household electronic appliance generating a noise synchronized with the power frequency or the half cycle is present over the transmission channel 102 in some cases. FIG. 8 shows a relationship between the noise and the power frequency when the household electronic appliance generating the noise synchronized with the half cycle is present.

When the switch 400 is turned on and the power line communication apparatus 106 generates and transmits the transmission channel estimation request to the power line communication apparatus 105, the frame for the transmission channel estimation request is transmitted to the power line communication apparatus 106 (105) of the communication opponent. The frame for the transmission channel estimation request is generated by the CPU 311 and transmitted to the power line communication apparatus 105 via the PLC transmission queue 312e, the PLC PHY block, the AFE IC, and the transmission channel 102.

The frame for the transmission channel estimation request includes a preamble, a frame control (FC), and a payload. The preamble is a frame used for synchronization of a transmitted or received symbol. In the example of FIG. 8, the preamble has a frame length of about 0.1 msec. The FC is a frame containing address information (MAC addresses, IP addresses, etc.) on the power line communication apparatuses of a transmission source and a transmission destination or information (a frame length of the payload) necessary for the payload, which is described below In the example of FIG. 8, the FC has a frame length of about 0.1 msec. The payload is a frame used to store actual data. In the example of FIG. 8, the payload has a frame length of about 1 msec. The frame length of the frame for the transmission channel estimation request is a sum of the lengths of the three frames and is about 1.2 msec.

As shown in FIG. 8, a period [1] is an interval for which a periodic noise is generated within a transmission period of the frame for the transmission channel estimation request. A period [2] is an interval for which the periodic noise is not generated within the transmission period of the frame for the transmission channel estimation request.

The periodic noise occurs in synchronization with the zero cross point (the point in the vicinity of the zero cross point) of voltage in the AC waveform of a commercial power supply. The periodic noise has a rectangular envelope and a voltage level of a portion where a noise does not occur is 0. In addition, a frequency of the AC waveform is different depending on a specification of every nation. Accordingly, the shape of the periodic noise is not limited to the rectangular form.

In the period [1], since a signal is distorted due to the periodic noise (a ration of signal to noise is deteriorated), the communication performance may deteriorate due to the occurrence of the periodic noise.

When only the results of the transmission channel estimation related to the period [2] are used to create the tone map, the tone map is not an appropriate tone map in the period [1]. Accordingly, the communication rate may deteriorate due to occurrence of re-transmission. Whether to overlap with the period noise depends on transmission timing of the frame for the transmission channel estimation request. For that reason, when the effective communication rate is estimated using only the PHY rates related to the period [2], there occurs a problem in that the state of the period [1] is not reflected.

FIG. 9 is a diagram illustrating a method of estimating the effective communication rate from the results of the transmission channel estimation.

The method of estimating the effective communication rate from the results of the transmission channel estimation can be considered to be used in addition to the method of estimating the effective communication rate from the average value of the PHY rate described above. As shown in FIG. 9, the CPU 311 calculates the effective communication rates from plural (twelve) PHY rates, which are calculated by the transmission channel estimation plural times (twelve times) and stored in the transmission channel estimation result storage 340b, with reference to the characteristic diagram of FIG. 7, calculates the average value of the effective communication rates from the calculated plural (twelve) effective communication rates, and sets the average value to an estimated effective communication rate. In the example of FIG. 9, the average value of the estimated effective communication rate is about 11.2 Mbps which is the TCP rate.

The CPU 311 permits the display 205 to display the requested effective communication rate calculated by the above-described method. When the effective communication rates are displayed using the LEDs, the number of lighting LEDs in accordance with the values of the effective communication rates may be changed, or the emission colors of the LEDs may be changed.

The effective communication rate may be displayed on an external device connected to the communication apparatus 100 or the UART 310a. When the effective communication rate is displayed using the external device such as a liquid crystal display or an EL display, the value of the effective communication rate may be displayed without any change. The number of the above-described transmission channel estimation is not limited to the twelve times.

Figure 10A:
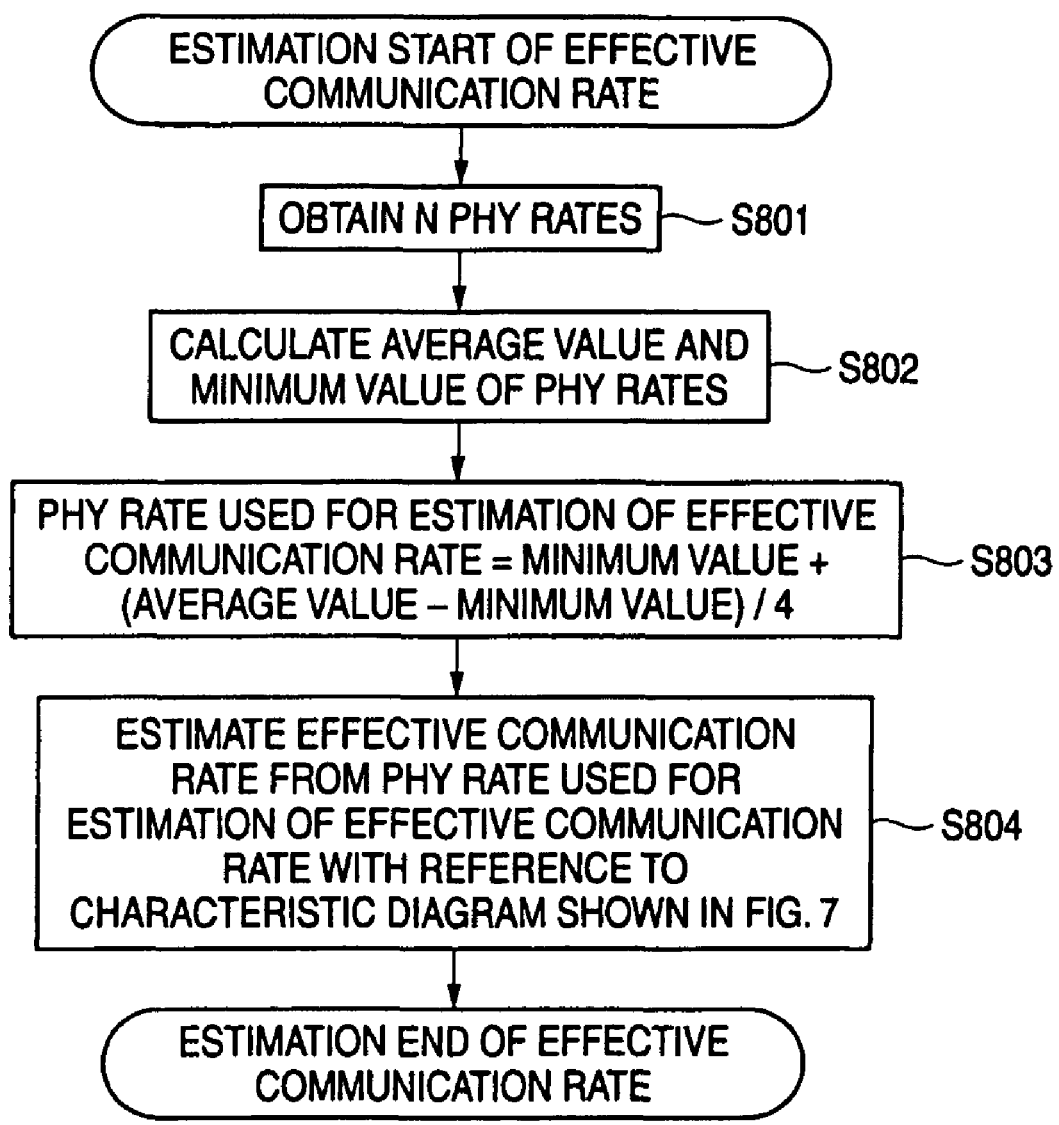
FIG. 10A is a flowchart illustrating an overall method of estimating the effective communication rate more precisely.

FIG. 10A is a flowchart illustrating an overall method of estimating the effective communication rate more precisely.

FIG. 10B is a flowchart illustrating the transmission channel estimation performed by a transmission side in detail. FIG. 10C is a flowchart illustrating the transmission channel estimation performed by a reception side in detail.

In the transmission channel estimation method shown in FIG. 10A, the CPU 311 performs the transmission channel estimation the defined plural times (twelve times) while performing a timeout process of the transmission channel estimation to obtain plural results (PHY rates) of the transmission channel estimation (Step S801). Subsequently, the CPU 311 calculates the average value and the minimum value from the plural (twelve) PHY rates obtained in Step S801 (This is Step S802).

Subsequently, the CPU 311 calculates the PHY rate used for the estimation of the effective communication rate using the average value and the minimum value of the PHY rates obtained in Step S802 (This is Step S803).

In the example of FIG. 10A, a value smaller than the average value of the plural (twelve) PHY rates is used as the PHY rate used for the estimation of the effective communication rate. Specifically, the PHY rate is defined by an expression of <minimum value+(average value−minimum value)/4>. In this expression, a flow control operation by which the TCP restrains the communication rate to be low when a loss of the communication data caused by the periodic noise present over the transmission channel 102 occurs is taken into consideration. In addition, a difference between the actual communication value and the estimation value can be made smaller. By using the value smaller than the average value of the PHY rates as the PHY rate used for estimation of the effective communication rate, it is possible to estimate the effective communication rate more precisely, even when the periodic noise is present over the transmission channel.

The method of calculating the PHY rate used for estimation of the effective communication rate is not limited to the above-described method. Instead of the average value, a value smaller than the average value may be used. Alternatively, the minimum value may be multiplied by a real number for weight.

Finally, the CPU 311 estimates a practical communication rate from the PHY rate used for estimation of the effective communication rate calculated in Step S803 with reference to the characteristic diagram of FIG. 7 (Step S804).

By calculating the effective communication rate on which the minimum value of the PHY rate reflects, it is possible to estimate the effective communication rate more precisely.

Next, the transmission channel estimation will be described in detail with reference to FIGS. 10B and 10C. In the example of FIG. 1, FIG. 10B shows a process flow in the power line communication apparatus 105 and FIG. 10C shows a process flow in the power line communication apparatus 106.

First, the process flow in the power line communication apparatus 105 as the transmission side will be described with reference to FIG. 10B. The CPU 311 defines the number n of transmission of the frame for the transmission channel estimation request as n=0 (Step S811). Next, the zero cross point detection circuit 401 detects the zero cross point (or the point in the vicinity of the zero cross point) of voltage in the AC power waveform of a commercial power supply supplied to the transmission channel 102, that is, the AC waveform formed by sine waves of 50 Hz or 60 Hz (Step S812). The frequency of the AC waveform is different depending on the specification of every nation.

Next, a first timer defines a practice period of the transmission channel estimation (Step S813). The first timer (not shown) is provided in the main IC 310. When the first timer defines the practice period of the transmission channel estimation, the CPU 311 starts the transmission channel estimation (Step S813). The CPU 311 transmits the frame for the transmission channel estimation request to the power line communication apparatus 106 in synchronization with the zero cross point (or the point in the vicinity of the zero cross point) detected by the zero cross point detection circuit 401 (Step S814). When the CPU 311 transmits the frame for the transmission channel estimation request, a second timer is reset. The second timer which is provided in the main IC 310 defines a reception period for which the results of the transmission channel estimation are transmitted from the power line communication apparatus 106 (Step S815). In Step S816, the CPU 311 determines whether to receive the results of the transmission channel estimation transmitted from the power line communication apparatus 106 (see Step S854). When the CPU 311 receives the results of the transmission channel estimation, the CPU 311 stores the results of the transmission channel estimation in the transmission channel estimation result storage 340b (Step S817). Next, the CPU 311 determines whether the reception period of the transmission channel estimation expires (Step S820). When the reception period expires, the value of the number n of transmission is updated to n=n+1 (Step S821). Next, the CPU 311 determines whether the value of transmission times n is smaller than a predetermined number N of transmission (N=12 in this embodiment) (Step S822). When the number n of transmission is smaller than the number N of transmission, the process returns to Step S813. Then, the CPU 311 repeatedly performs the same process described above until the condition of Step S822 is satisfied.

Alternatively, when the results of the transmission channel estimation are not received, the results of the transmission channel estimation transmitted from the power line communication apparatus 106 (105) of the communication opponent are waited until the reception period defined by the second timer expires (Step S818). When the reception period expires without receiving the results of the transmission channel estimation, the results of the transmission channel estimation are stored as the PHY rate=0 Mbps (or very small value or a negative value) in the transmission channel estimation result storage 340b (Step S819).

Next, the process flow of the power line communication apparatus 106 as the reception side will be described with reference to FIG. 10C. When the frame for the transmission channel estimation is transmitted form the power line communication apparatus 105 (see Step S814), the CPU 311 receives the frame for the transmission channel estimation. Subsequently, the CPU 311 defines the number n of reception of the frame for the transmission channel estimation as n=0 (Step S852). Subsequently, the CPU 311 calculates the tone map and the PHY rate used for the modulation and demodulation between the communication apparatuses on the basis of the received frame for the transmission channel estimation (Step S853). Subsequently, the CPU 311 transmits the result of the tone map and the PHY rate calculated in Step S853 to the power line communication apparatus 105 as the transmission side (Step S854). Subsequently, the CPU 311 stores the result of the calculated tone map and PHY rate in the transmission channel estimation result storage 340b (Step S855). Then, the number n of reception of the frame for the transmission channel estimation is updated to n=n+1. Finally, the CPU 311 determines whether the value of the number n of reception satisfies a condition of n>N (where N is the same value as a value of a predetermined number of reception). The CPU 311 repeatedly performs the same process described above until the condition is satisfied (Step S857).

FIG. 11 is a diagram illustrating the result of a simulation determining whether to detect the periodic noise caused by a difference of start timing of the transmission channel estimation. Whether to detect the periodic noise depends on whether timing at which the transmission channel estimation is performed accords with timing at which the periodic noise occurs. This simulation calculates a parameter determining whether the timing at which the transmission channel estimation is performed accords with the timing at which the periodic noise occurs and also calculates the result.

The power frequency and a generation period of the periodic noise are determined depending on a location where the power line communication apparatus is used. As described above, the power frequencies used in Japan are 50 Hz and 60 Hz. The half cycle of 50 Hz is about 10 msec and the half cycle of 60 Hz is about 8.33 msec.

The execution timing and the practice number of times in the transmission channel estimation can be changed by a program. In this embodiment, the transmission channel estimation is performed every 500 msec and the transmission channel estimation is performed 12 times.

An opportunity of detecting the periodic noise is also determined in accordance with the timing at which a first transmission channel estimation is performed at which timing of the generation period of the periodic noise. The timing at which the transmission channel estimation is performed is offset time of measurement start and varies from 0 to the generation period of the noise. The offset time can be set to 0 by synchronizing the first transmission channel estimation with the zero cross point of the power frequency. In a case of a communication apparatus which is not capable of detecting the zero cross point, the offset time varies in a range from 0 to the generation period of the noise.

In this simulation, time at which the periodic noise occurs is compared in timing close to the timing at which the transmission channel estimation is performed twelve times. When the periodic noise and the frame for the transmission channel estimation request are present within 2 msec from the zero cross point, it is determined that the both accord with each other and "BINGO" is indicated. The time width of 2 msec is determined in consideration of a period for which the periodic noise affects communication.

FIG. 12 is a diagram illustrating a relationship between detection of the periodic noise and the offset time of the timing at which the transmission channel estimation is performed.

In FIG. 12, in the above-described simulation, the offset time of the execution timing of the transmission channel estimation is changed up to 8 msec at an interval of 1 msec to execute the simulation, and the number of times of periodic noise detection is shown.

FIG. 12A shows the simulation result when the power frequency is set to 60 Hz. FIG. 12B shows the simulation result when the power frequency is set to 50 Hz.

As apparent from FIGS. 12A and 12B, it is possible to typically obtain the results of the transmission channel estimation affected by the periodic noise, when the transmission channel estimation is performed from the zero cross point in synchronization with the power frequency. Accordingly, it is preferable to make a measurement in synchronization with the zero cross point in order to is perform the transmission channel estimation more precisely.

Since the power line communication apparatus 105 (106) is actually affected by time measurement precision, the timing at which the transmission channel estimation is performed is different from the values shown in FIG. 11. Accordingly, a case where the periodic noise is detected 100% or is not detected at all in FIG. 12 does not occur in the actual power line communication apparatus 105 (106). However, a tendency of the largeness and smallness of the number of detection of the periodic noise can be understood.

Even the communication apparatus which is capable of detecting the zero cross point can surely obtain the results of the transmission channel estimation affected by the periodic noise by using precision of time measurement of the device or intentionally shifting the measurement start time by several msec using a program.

Figure 13:
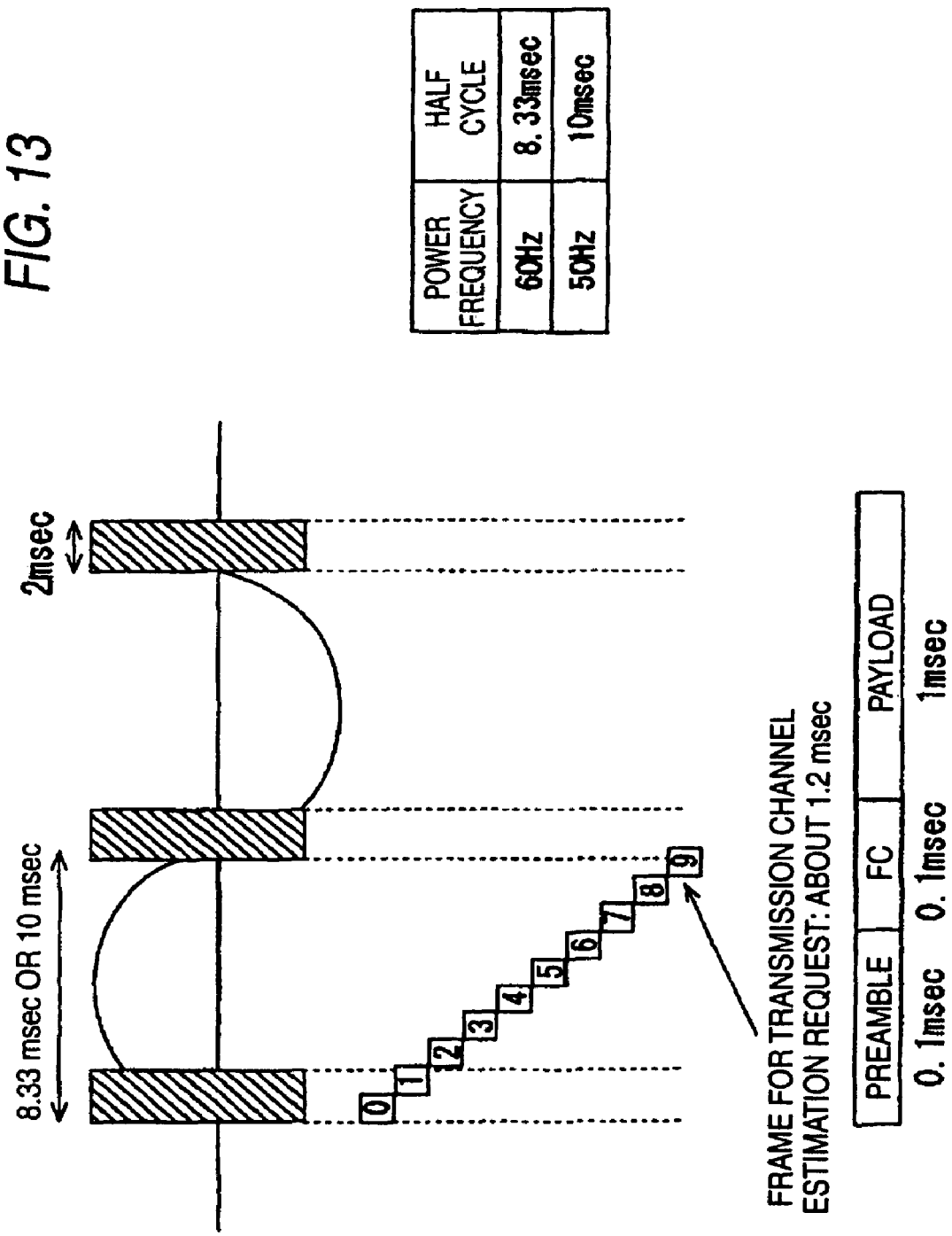
FIG. 13 is a diagram illustrating a method of transmitting a frame for the transmission channel estimation request in succession and detecting the periodic noise.

FIG. 13 is a diagram illustrating a method of transmitting the frame for the transmission channel estimation request in succession and detecting the periodic noise. In an example of FIG. 13, ten frames for the transmission channel estimation request are transmitted in succession. In the example of FIG. 13, since a sum of a frame length of the ten frames for the transmission channel estimation request requested in succession is about 12 msec, the sum of the frame length covers the half frequency of 8.33 msec (power frequency 60 Hz).

In this way, when the plural frames for the transmission channel estimation request are transmitted in succession and cover the half of the power frequency, it is possible to surely perform the transmission channel estimation on which the influence of the periodic noise reflects.

Figure 14:
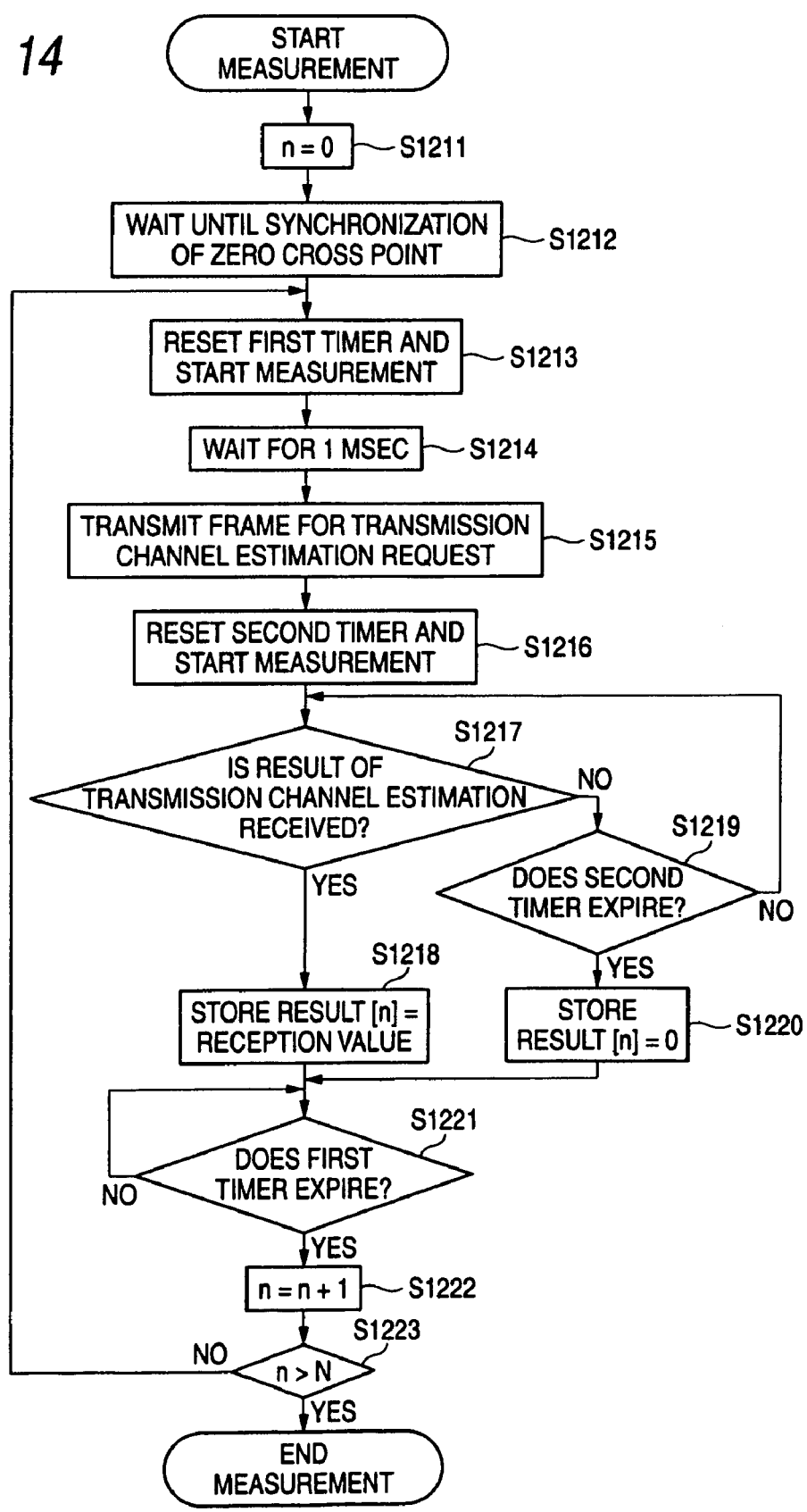
FIG. 14 is a diagram illustrating the transmission channel estimation in detail when the frames for the transmission channel estimation request are transmitted in succession.

FIG. 14 is a diagram illustrating the transmission channel estimation in detail when the frames for the transmission channel estimation request are transmitted in succession.

Next, the transmission channel estimation will be described in detail with reference to FIG. 14. FIG. 14 shows operations of the transmission side, and the operations correspond to the process flow of the power line communication apparatus 105 in the example of FIG. 1. The process flow of the reception side is the same that in FIG. 10C and thus the details are omitted.

First, the CPU 311 defines the number n of transmission of the frame for the transmission channel estimation request as n=0 (Step S1211). Next, the zero cross point detection circuit 401 detects the zero cross point (or the point in the vicinity of the zero cross point) of voltage in the AC power waveform of a commercial power supply supplied to the transmission channel 102, that is, the AC waveform formed by sine waves of 50 Hz or 60 Hz (Step S1212). The frequency of the AC waveform is different depending on the specification of every nation. Next, the first timer defines a practice period of the transmission channel estimation (Step S1213). The first timer (not shown) is provided in the main IC 310. When the first timer defines the practice period of the transmission channel estimation, the CPU 311 starts the transmission channel estimation (Step S1213). Next, the CPU 311 sets offset time of 1 msec in the process flow of the transmission channel estimation (Step S1214). After the CPU 311 sets the offset time, the CPU 311 transmits the frame for the transmission channel estimation request to the power line communication apparatus 106 (Step S1215).

When the CPU 311 transmits the frame for the transmission channel estimation request, the second timer is reset and defines a reception period for which the result of the transmission channel estimation is transmitted from the power line communication apparatus 106 (105) (Step S1216). The second timer (not shown) is provided in the main IC 310. In Step S1217, the CPU 311 determines whether to receive the results of the transmission channel estimation. When receiving the results (the tone map and the PHY rates) of the transmission channel estimation from the power line communication apparatus 106, the CPU 311 stores the results of the transmission channel estimation in the transmission channel estimation result storage 340b (Step S1218). Next, the CPU 311 determines whether the reception period of the transmission channel estimation expires (Step S1221). When the reception period expires, the value of the number n of transmission is updated to n=n+1 (Step S1222). Next, the CPU 311 determines whether the value of the number n of transmission is smaller than a predetermined number N of transmission (N=12 in this embodiment) (Step S1223). When the number n of transmission is smaller than the number N of transmission, the process returns to Step S1213.

Alternatively, when the CPU 311 does not receive the results of the transmission channel estimation, the results of the transmission channel estimation transmitted from the power line communication apparatus 106 (105) are waited until the reception period defined by the second timer expires (Step S1219). When the CPU 311 does not receive the results of the transmission channel estimation and the reception period expires, the results of the transmission channel estimation are stored as the PHY rate=0 Mbps (or very small value or a negative value) in the transmission channel estimation result storage 340b (Step S1220).

In this way, by performing the transmission channel estimation in succession, it is possible to obtain the results of the transmission channel estimation on which the influence of the periodic noise reflects. In the above-described example, the transmission channel estimation is performed in synchronization with the periodic noise. However, without the synchronization with the periodic noise, it is possible to obtain the results of the transmission channel estimation on which the influence of the periodic noise reflects. Moreover, by changing the number of times of the transmission channel estimation, it is also possible to perform the transmission channel estimation on which the influence of a noise having no period reflects.

The number N of transmission of the frame for the transmission channel estimation may be determined in accordance with the period of AC voltage. In this way, it is possible to flexibly deal with specifications of respective nations. The number N of transmission is determined when the CPU 311 calculates the period of the AC voltage.

Figure 15:
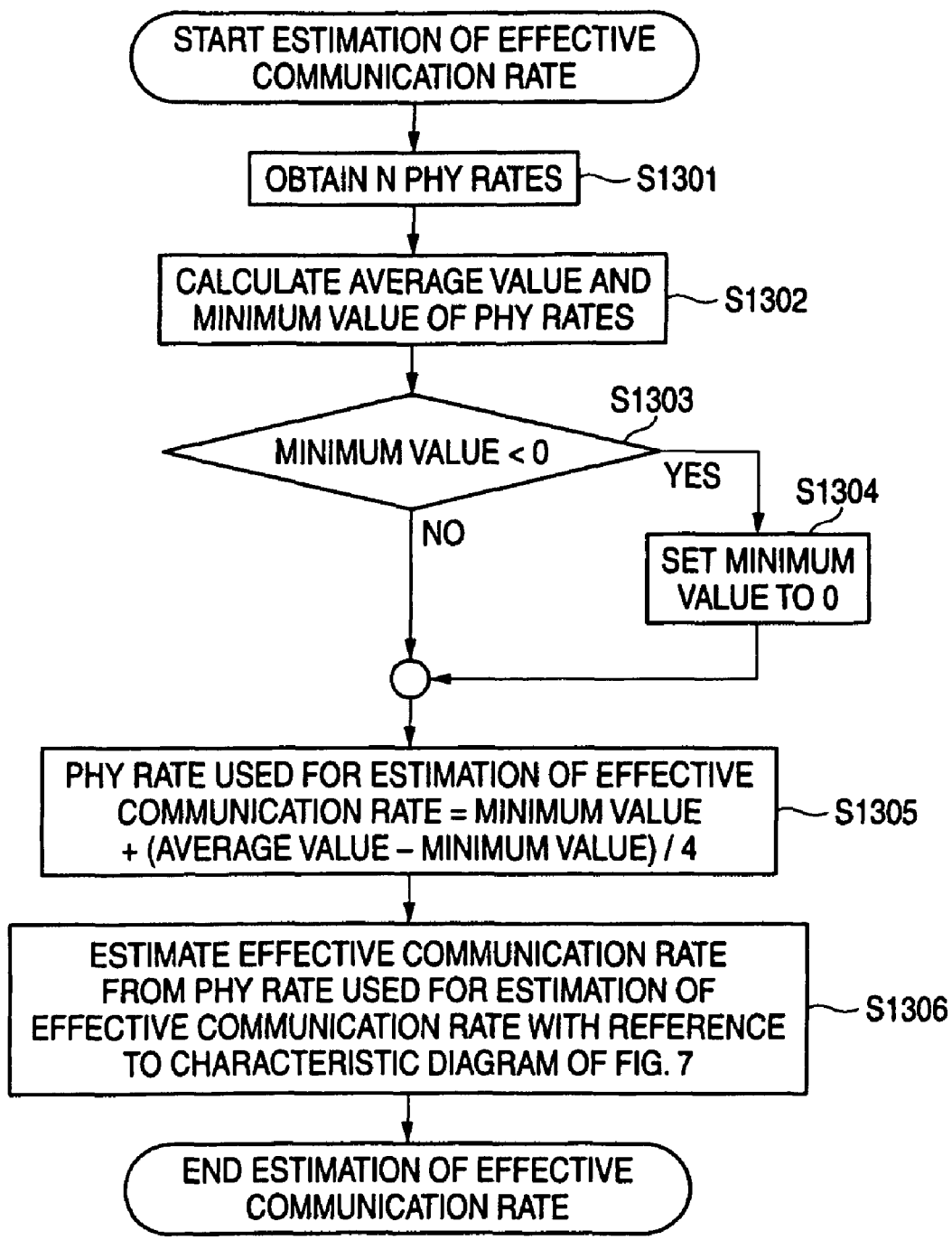
FIG. 15 is a flowchart illustrating an overall method of estimating the effective communication rate more precisely.

FIG. 15 is a flowchart illustrating an overall method of estimating the effective communication rate more precisely.

Like the above-described transmission channel estimation method in FIG. 10A, in the transmission channel estimation method shown in FIG. 15, the CPU 311 performs the transmission channel estimation plural defined times (for example, twelve times) while performing a timeout process of the transmission channel estimation to obtain plural results (PHY rates) of the transmission channel estimation (Step S1301). Next, the CPU 311 calculates the average value and the minimum value from the plural (twelve) PHY rates obtained in Step S1301 by (Step S1302). Subsequently, it is determined that the minimum value of the PHY rates calculated in Step S1302 is a negative value (Step S1303). When the minimum value is the negative value, the minimum value is substituted by 0 (Step S1304).

Next, the CPU 311 calculates the PHY rate used for the estimation of the effective communication rate using the average value and the minimum value of the PHY rates obtained in Steps S1302 and S1304 (Step S1305). Like the example of FIG. 10A, in the example of FIG. 15, a relationship between the PHY rate used for the estimation of the effective communication rate and the average value and the minimum value of the PHY rates is represented by the expression of <minimum value+(average value−minimum value)/4>. In this expression, a flow control operation in which the TCP restrains the communication rate to be low when a loss of the communication data caused by the periodic noise present over the transmission channel 102 occurs is taken into consideration. In addition, the advantage of lessening a difference between the communication value and the estimation value can be obtained. As the PHY rate used for estimation of the effective communication rate, the PHY rate smaller than the average value of the PHY rates may be used instead of the expression of <minimum value+(average value−minimum value)/4>. For example, the actually measured minimum value may be used. In addition, the PHY rate used for the estimation of the effective communication rate may be weighted by multiplying the PHY rate by an arbitrary real number.

Finally, the CPU 311 estimates a practical communication rate from the PHY rate used for estimation of the effective communication rate calculated in Step S1305 with reference to the characteristic diagram of FIG. 7 (Step S1306).

By calculating the effective communication rate on which the minimum value of the PHY rate reflects, it is possible to estimate the effective communication rate more precisely.

Second Embodiment

A second embodiment will describe an example of using a method by which the plural transmission channels are estimated when the communication rate such as the communicable PHY rate is calculated by the transmission channel estimation.

Figure 16:
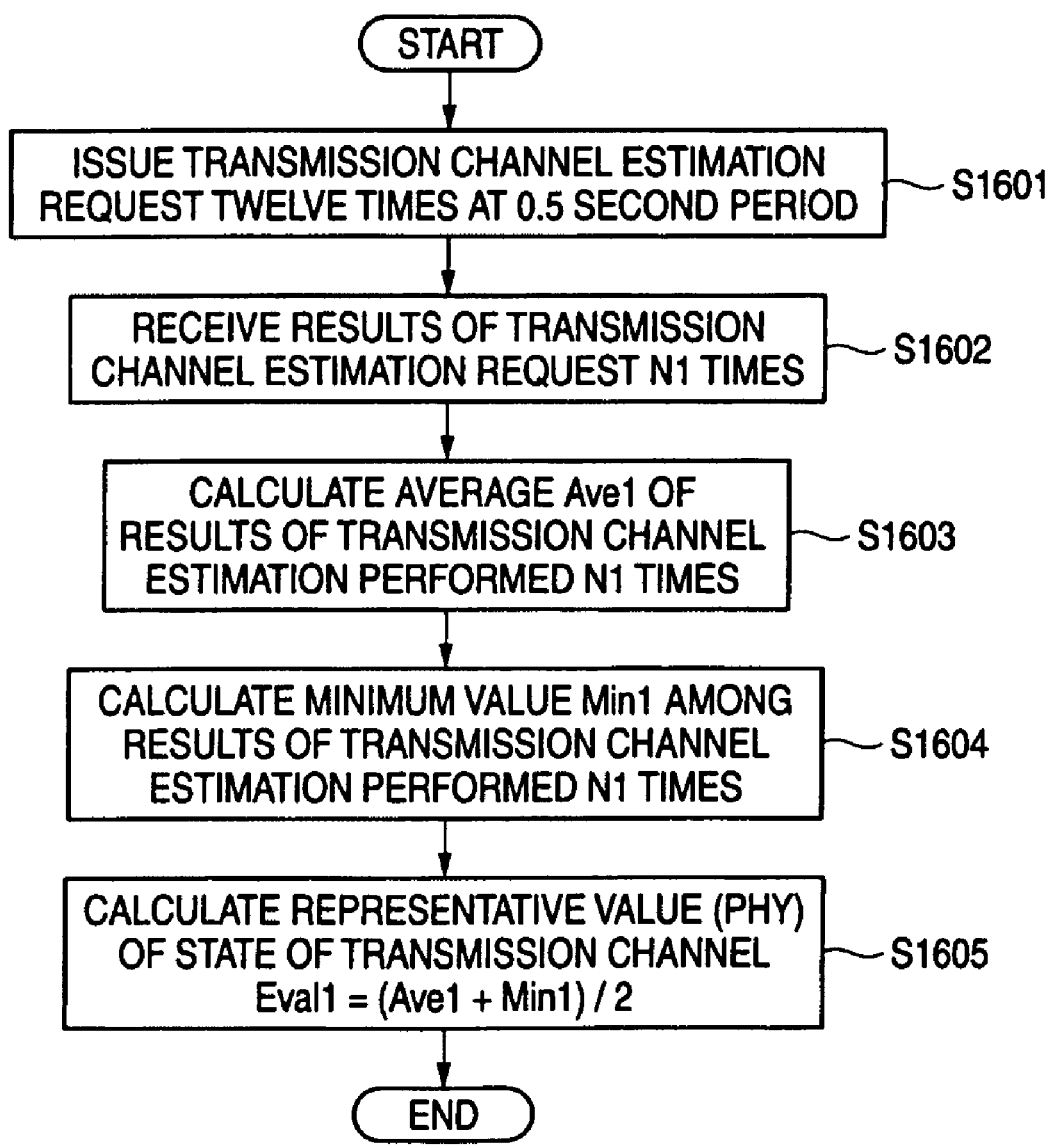
FIG. 16 is a flowchart illustrating a process sequence of a first estimation method (Estimation Method 1) according to a second embodiment.

FIG. 16 is a flowchart illustrating a process sequence of a first estimation method (Estimation Method 1) according to the second embodiment.

In Estimation method 1 illustrated in FIG. 16, the CPU 311 transmits the transmission channel estimation request to the power line communication apparatus of the communication opponent. At this time, the transmission channel estimation request is issued twelve times at a period of 0.5 second, for example (Step S1601). Subsequently, the results of the transmission channel estimation are received N1 times from the power line communication apparatus of the communication opponent (Step S1602). At this time, the reception times N1 satisfies a condition of (N1≦12) and refers to the number of times by which the results of the transmission channel estimation can normally be received.

Subsequently, the CPU 311 calculates an average value Ave1 of the results (PHY rates) of the transmission channel estimation replied N1 times (Step S1603). Subsequently, the minimum value Min1 is obtained from the results (PHY rate) of the transmission channel estimation performed N1 times (Step S1604). Subsequently, a representative value Eval1 of the PHY rates which indicates a state of the transmission channel is calculated (Step S1605). At this time, the representative value Eval1 of the PHY rates is calculated by an expression of Eval1=(Ave1+Min1)/2. The calculated representative value Eval1 is a result obtained by Estimation method 1.

Figure 17:
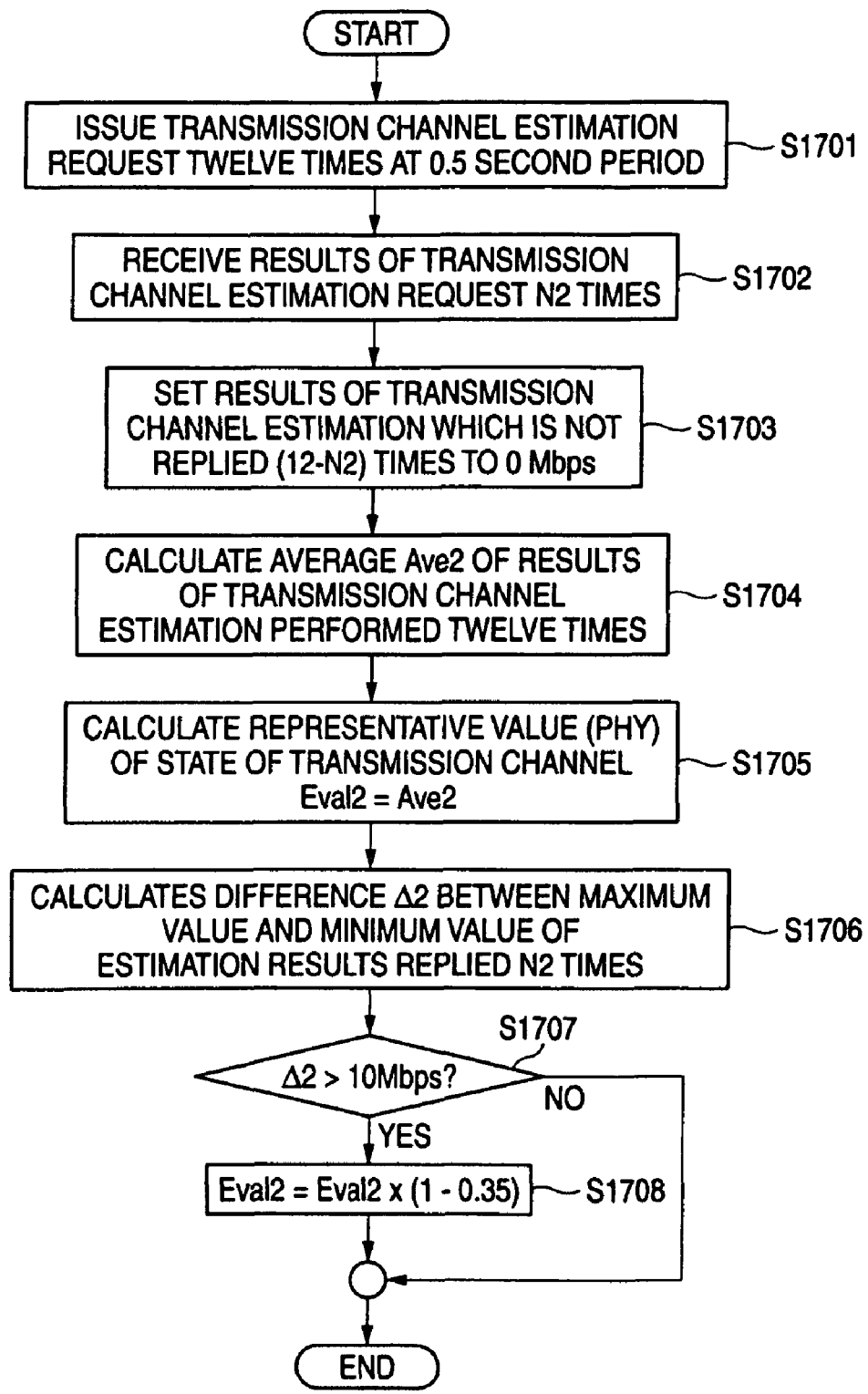
FIG. 17 is a flowchart illustrating a process sequence of a second estimation method (Estimation Method 2) according to the second embodiment.

FIG. 17 is a flowchart illustrating a process sequence of a second estimation method (Estimation Method 2) according to the second embodiment.

Like Estimation Method 1, in Estimation Method 2 shown in FIG. 17, the CPU 311 transmits the transmission channel estimation request twelve times at a 0.5 second period to the power line communication apparatus of the communication opponent (Step S1701). Subsequently, the results of the transmission channel estimation are received N2 times from the power line communication apparatus of the communication opponent (Step S1702). At this time, the reception times N2 is represented by a condition of (N2≦12) and refers to the number of times by which the results of the transmission channel estimation result can normally be received. In this case, the results which are not replied (12−N2) times are set to 0 Mbps (Step S1703).

Subsequently, the CPU 311 calculates an average value Ave2 of the entire results (PHY rate) of the transmission channel estimation performed twelve times in addition to cases where the reply is not obtained or the measurement is not possible (Step S1704). Subsequently, a representative value Eval2 of the PHY rates which indicates the state of the transmission channel is calculated (Step S1705). At this time, the representative value Eval2 of the PHY rates is calculated by an equation of Eval2=Ave2.

Subsequently, a difference $\Delta 2$ between the maximum value and the minimum value of the results (PHY rate) of the transmission channel estimation replied N2 times is obtained (Step S1706). It is determined whether the difference $\Delta 2$ between the maximum value and the minimum value is larger than 10 Mbps (Step S1707). When the difference $\Delta 2$ is larger than 10 Mbps, the value Eval2 multiplied in consideration of a retransmission ratio is calculated (Step S1708). On the assumption that the retransmission ratio is 35%, the representative value Eval2 is calculated by an expression of Eval2=Eval2×(1−0.35). The calculated representative value Eval2 is set to the estimation result obtained by Estimation Method 2. Alternatively, when the difference $\Delta 2$ is equal to or less than 10 Mbps in Step S1708, the representative value Eval2 is set to the estimation result obtained by Estimation Method 2 without consideration of the retransmission ratio.

Figure 18:
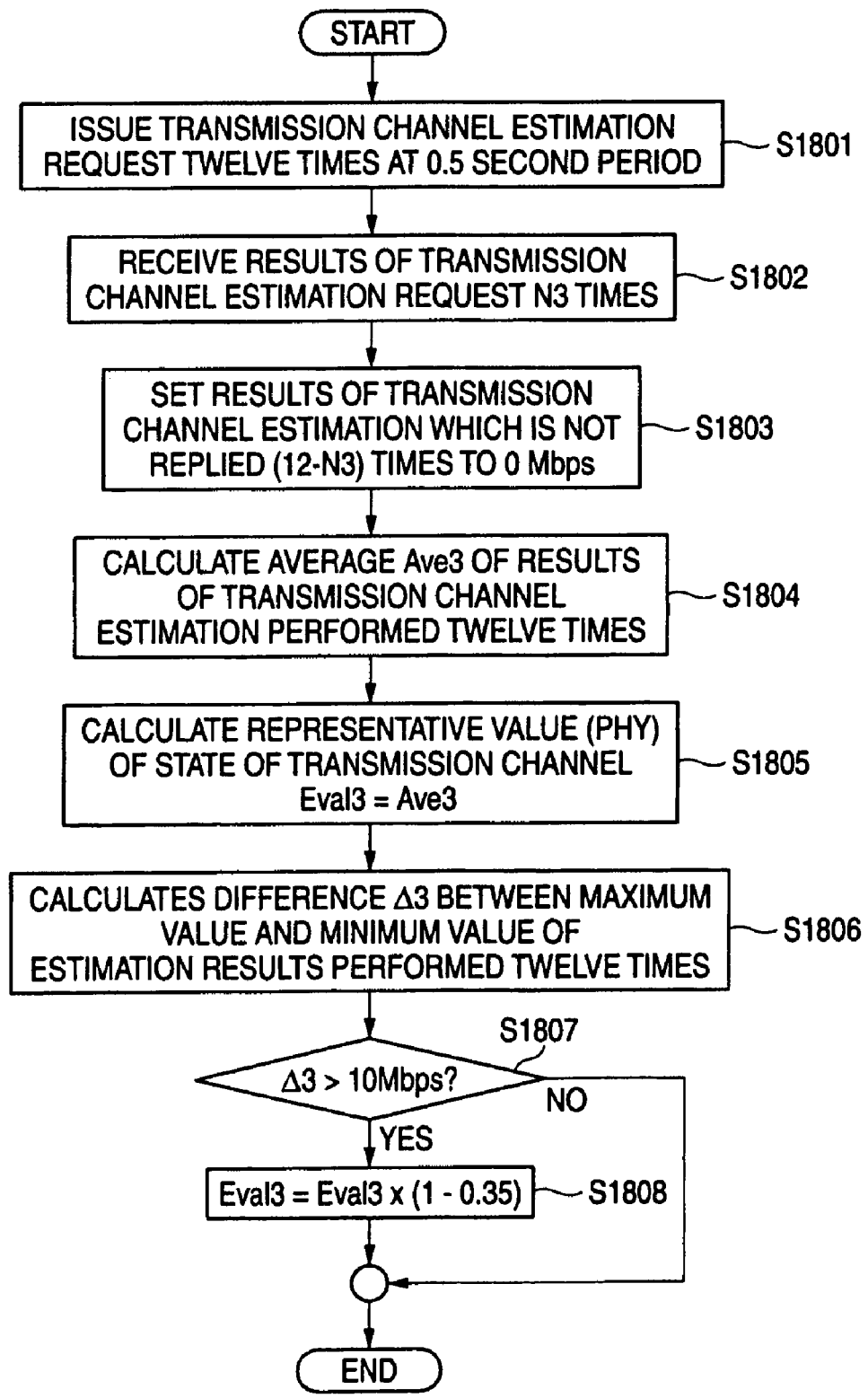
FIG. 18 is a flowchart illustrating a process sequence of a third estimation method (Estimation Method 3) according to the second embodiment.

FIG. 18 is a flowchart illustrating a process sequence of a third estimation method (Estimation Method 3) according to the second embodiment.

Like Estimation Method 2, in Estimation Method 3 shown in FIG. 18, the CPU 311 transmits the transmission channel estimation request twelve times at a 0.5 second period to the power line communication apparatus of the communication opponent (Step S1801). Subsequently, the results of the transmission channel estimation are received N3 times from the power line communication apparatus of the communication opponent (Step S1802). The reception times N3 is represented by a condition of (N3≦12) and refers to the number of times by which the results of the transmission channel estimation can normally be received. In this case, the results which are not replied (12−N3) times are set to 0 Mbps (Step S1803).

Subsequently, the CPU 311 calculates an average value Ave3 of the entire results (PHY rate) of the transmission channel estimation performed twelve times in addition to the cases where the reply is not obtained or the measurement is not possible (Step S1804). Subsequently, a representative value Eval3 of the PHY rates which indicates the state of the transmission channel is calculated (Step S1805). At this time, the representative value Eval3 of the PHY rates is calculated by an equation of Eval3=Ave3.

Subsequently, there is obtained a difference $\Delta 3$ between the maximum value and the minimum value of the entire results (PHY rate) of the transmission channel estimation performed twelve times in addition to the cases where the reply is not obtained or the measurement is not possible (Step S1806). It is determined whether the difference $\Delta 3$ between the maximum value and the minimum value is larger than 10 Mbps (Step S1807). When the difference $\Delta 3$ is larger than 10 Mbps, the value Eval3 multiplied in consideration of the retransmission ratio is calculated (Step S1808). On the assumption that the retransmission ratio is 35%, the representative value Eval3 is calculated by an expression of Eval3=Eval3×(1−0.35). The calculated representative value Eval3 is set to the estimation result obtained by Estimation Method 3. Alternatively, when the difference $\Delta 3$ is equal to or less than 10 Mbps in Step S1808, the representative value Eval3 is set to the estimation result obtained by Estimation Method 3 without consideration of the retransmission ratio.

FIGS. 19 to 23 show examples of the respective estimation results obtained by the above-described plural Estimation Methods 1 to 3, respectively in the several supposed states of the transmission channel.

FIG. 19 is a diagram illustrating as Case 1 Calculation Example 1 of the results of the transmission channel estimation performed when the transmission channel is in a poor state and thus the variations in a noise affect the transmission channel. In FIGS. 19 to 23, numbers 1 to 12 denotes measurement values of the PHY rates, a number 13 denotes the result Eval1 of the transmission channel estimation obtained by Estimation Method 1, a number 14 denotes the result Eval2 of the transmission channel estimation obtained by Estimation Method 2, and a number 15 denotes the result Eval3 of the transmission channel estimation obtained by Estimation Method 3.

Case 1 shows an example in which the twelfth transmission channel estimation is not replied or the measurement is not possible. In Estimation Method 1, the average value Ave1 of the measurement values in the transmission channel estimation which is replied eleven times is calculated. Since the average value Ave1≈20.6 Mbps, the result Eval1 of the transmission channel estimation is represented by an expression of (Ave1+Min1)/2=(20.6+19.0)/2≈19.8 Mbps. The calculation result Eval1=19.8 Mbps is used as the result Eval1 of the transmission channel estimation obtained by Estimation Method 1. In the case of Estimation Method 1, the result estimated from the measurement results which are replied is simply obtained.

The average value Ave2 of the measurement values obtained by performing the transmission channel estimation twelve times in addition to the case (0 Mbps) of no reply is calculated by Estimation Method 2. Since the average value Ave2≈18.9 Mbps, the result Eval2 of the transmission channel estimation is represented by the equation of Eval2=Ave2≈18.9 Mbps. Next, the difference $\Delta 2$ between the maximum value and the minimum value obtained by performing the transmission channel estimation replied eleven times is $\Delta 2$=3. In this case, since the difference $\Delta 2$ is 10 Mbps or less, the estimation result Eval2=18.9 Mbps is used as the result Eval2 of the transmission channel estimation obtained by Estimation Method 2 without consideration of the retransmission ratio. In the case of Estimation Method 2, there is obtained the good precise result estimated in addition to the case of no reply.

Like Estimation Method 2, the average value Ave3 of the measurement values obtained by performing the transmission channel estimation twelve times in addition to the case (0 Mbps) of no reply is calculated by Estimation Method 3. Since the average value Ave3≈18.9 Mbps, the result Eval3 of the transmission channel estimation is represented by the equation of Eval3=Ave3≈18.9 Mbps. Next, the difference $\Delta 3$ between the maximum value and the minimum value obtained by performing the transmission channel estimation twelve times in addition to the case of no reply is $\Delta 3$=22. In this case, since the difference $\Delta 3$ is larger than 10 Mbps, the expression of Eval3=Eval3×(1−0.35)=18.9×(1−0.35)≈12.3 Mbps is satisfied in consideration of the retransmission ratio. The estimation result Eval3=12.3 Mbps is used as the result Eval3 of the transmission channel estimation obtained by Estimation Method 3. In the case of Estimation Method 3, there is obtained the good precise result on which the measurement value of the case of no reply considerably reflects.

In Case 1, Estimation Method 1 and Estimation Method 2 do not satisfactorily reflect the influence of variations caused by the noise in some cases. However, by Estimation Method 3, it is possible to obtain the results of the transmission channel estimation on which the influence of the variations caused by the noise reflects. A precise estimation result can be obtained by multiplying the retransmission ratio when the rates of the differences $\Delta 2$ and $\Delta 3$ are more than a fixed rate. However, the differences $\Delta 2$ and $\Delta 3$ can exceed 10 Mbps in some cases due to the declination of the measurement values in a location where a high speed transmission is possible. Accordingly, a value for comparing the differences $\Delta 2$ and $\Delta 3$ may be changed in accordance with the range of the values of Eval2 and Eval3. For example, when Eval2 and Eval3 are 60 Mbps or less, the differences $\Delta 2$ and $\Delta 3$ are compared to 10 Mbps. When the differences $\Delta 2$ and $\Delta 3$ are larger than 60 Mbps, the differences $\Delta 2$ and $\Delta 3$ may be compared to 20 Mbps. However, when a process of displaying the same estimation result is performed in a function displaying the results of the rate estimation described below in a case where the rates of the differences $\Delta 2$ and $\Delta 3$ are more than the fixed rate, the same result is obtained in some cases without division of such a range.

FIG. 20 is a diagram illustrating as Case 2 Calculation Example 2 of the results of the transmission channel estimation performed when the transmission channel is in a poor state and thus the variations in a noise affect the transmission channel.

Case 2 shows an example in which the tenth to twelfth transmission channel estimations performed three times are not replied or the measurement is not possible. In Estimation Method 1, the average value Ave1 of the measurement values in the transmission channel estimation which is replied nine times is calculated. Since the average value Ave1≈20.6 Mbps, the result Eval1 of the transmission channel estimation is represented by an expression of (Ave1+Min1)/2=(20.3+19.0)/2≈19.7 Mbps. The calculation result Eval1=19.7 Mbps is used as the result Eval1 of the transmission channel estimation obtained by Estimation Method 1.

The average value Ave2 of the measurement values obtained by performing the transmission channel estimation twelve times in addition to the case (0 Mbps) of no reply is calculated by Estimation Method 2. Since the average value Ave2≈15.3 Mbps, the result Eval2 of the transmission channel estimation is represented by the equation of Eval2=Ave2≈15.3 Mbps. Next, the difference $\Delta 2$ between the maximum value and the minimum value obtained by performing the transmission channel estimation replied nine times is $\Delta 2=3$. In this case, since the difference $\Delta 2$ is 10 Mbps or less, the estimation result Eval2=15.3 Mbps is used as the result Eval2 of the transmission channel estimation obtained by Estimation Method 2 without consideration of the retransmission ratio.

Like Estimation Method 2, the average value Ave3 of the measurement values obtained by performing the transmission channel estimation twelve times in addition to the case (0 Mbps) of no reply is calculated by Estimation Method 3.

Since the average value Ave3≈15.3 Mbps, the result Eval3 of the transmission channel estimation is represented by the equation of Eval3=Ave3≈15.3 Mbps. Next, the difference $\Delta 3$ between the maximum value and the minimum value obtained by performing the transmission channel estimation twelve times in addition to the case of no reply is $\Delta 3=22$. In this case, since the difference $\Delta 3$ is larger than 10 Mbps, the expression of Eval3=Eval3×(1−0.35)=15.3×(1−0.35)≈9.9 Mbps is satisfied in consideration of the retransmission ratio.

The estimation result Eval3=9.9 Mbps is used as the result Eval3 of the transmission channel estimation obtained by Estimation Method 3.

In Case 2, Estimation Method 1 cannot sufficiently reflect the influence of the variations in the noise. However, by Estimation Method 2, it is possible to obtain the results of the transmission channel estimation on which the influence of the variations in the noise reflects. By using Estimation Method 3, it is possible to more precisely obtain the results of the transmission channel estimation on which the influence of the variations in the noise reflects.

FIG. 21 is a diagram illustrating as Case 3 a calculation example of the results of the transmission channel estimation performed when the transmission channel is not in a good state but the variations in a noise do not affect the transmission channel.

Case 3 shows an example in which the measurement results are obtained by performing the transmission channel estimation twelve times. In Estimation Method 1, the average value Ave1 of the measurement values obtained by performing the transmission channel estimation replied twelve times is calculated. Since the average value Ave1≈30.9 Mbps, the result Eval1 of the transmission channel estimation is represented by an expression of (Ave1+Min1)/2=(30.9+29.0)/2≈30.0 Mbps. The calculation result Eval1=30.0 Mbps is used as the result Eval1 of the transmission channel estimation obtained by Estimation Method 1.

The average value Ave2 of the measurement values obtained by performing the transmission channel estimation twelve times in addition to the case (0 Mbps) of no reply is calculated by Estimation Method 2. Since the transmission channel estimation is all replied twelve times and thus the equation of the average value Ave2≈30.9 Mbps is satisfied, the result Eval2 of the transmission channel estimation is represented by the equation of Eval2=Ave2≈30.9 Mbps. Next, the difference $\Delta 2$ between the maximum value and the minimum value obtained by performing the transmission channel estimation replied twelve times is $\Delta 2=3$. In this case, since the difference $\Delta 2$ is 10 Mbps or less, the estimation result Eval2=30.9 Mbps is used as the result Eval2 of the transmission channel estimation obtained by Estimation Method 2 without consideration of the retransmission ratio.

Like Estimation Method 2, the average value Ave3 of the measurement values obtained by performing the transmission channel estimation twelve times in addition to the case (0 Mbps) of no reply is calculated by Estimation Method 3.

Since the average value Ave3≈30.9 Mbps, the result Eval3 of the transmission channel estimation is represented by the equation of Eval3=Eval3≈30.9 Mbps. Next, the difference $\Delta 3$ between the maximum value and the minimum value obtained by performing the transmission channel estimation twelve times in addition to the case of no reply is calculated. Since the transmission channel estimation is all replied twelve times, the difference $\Delta 3=3$ like Estimation Method 2. Accordingly, since the difference $\Delta 3$ is larger than 10 Mbps, the estimation result Eval3=30.9 Mbps is used as the result Eval3 of the transmission channel result obtained by Estimation Method 3 without consideration of the retransmission ratio.

In Case 3, the variations in the noise do not affect the transmission channel. Accordingly, since the measurement result of the state of the transmission channel is stable, the precise result of the transmission channel estimation can be obtained by any one of Estimation Methods 1, 2, and 3.

FIG. 22 is a diagram illustrating as Case 4 a calculation example of the result of the transmission channel estimation performed when the transmission channel is in a good state and thus a noise does not affect the transmission channel.

Case 4 shows an example in which the good measurement results are obtained by performing the transmission channel estimation twelve times. In Estimation Method 1, the average value Ave1 of the measurement values obtained by performing the transmission channel estimation replied twelve times is calculated. Since the average value Ave1≈110.2 Mbps, the result Eval1 of the transmission channel estimation is represented by an expression of (Ave1+Min1)/2=(110.9+101.0)/2≈105.6 Mbps. The calculation result Eval1=105.6 Mbps is used as the result Eval1 of the transmission channel estimation obtained by Estimation Method 1.

By Estimation Method 2, the result Eval2 of the transmission channel estimation is calculated from the average value Ave2 of the measurement values obtained by performing the transmission channel estimation twelve times in addition to the case (0 Mbps) of no reply. Like Estimation Method, since the transmission channel estimation is all replied twelve times and thus the average value Ave2≈110.2 Mbps 1, the result Eval2 of the transmission channel estimation is represented by the equation of Eval2=Ave2≈110.2 Mbps. Next, the difference Δ2 between the maximum value and the minimum value obtained by performing the transmission channel estimation replied twelve times is Δ2=13. In this case, since the difference Δ2 is larger than 10 Mbps, the expression of Eval2=Eval2×(1−0.35)=110.2×(1−0.35)≈71.6 Mbps is satisfied in consideration of the retransmission ratio. The estimation result Eval2=71.6 Mbps is used as the result Eval2 of the transmission channel estimation obtained by Estimation Method 2.

Like Estimation Method 2, the average value Ave3 of the measurement values obtained by performing the transmission channel estimation twelve times in addition to the case (0 Mbps) of no reply is calculated by Estimation Method 3. Since the average value Ave3≈110.2 Mbps, the result Eval3 of the transmission channel estimation is represented by the equation of Eval3=Eval3≈110.2 Mbps. Next, the difference Δ3 between the maximum value and the minimum value obtained by performing the transmission channel estimation twelve times in addition to the case of no reply is calculated. Since the transmission channel estimation is all replied twelve times, the difference Δ3=13 like Estimation Method 2. Accordingly, since the expression of Eval3=Eval3×(1−0.35)≈71.6 Mbps is satisfied in consideration of the retransmission ratio like Estimation Method 2, the estimation result Eval3=71.6 Mbps is used as the result Eval3 of the transmission channel estimation obtained by Estimation Method 3.

In Case 4, since the transmission channel is in a good state, the precise results of the transmission channel estimation can be obtained by any one of Estimation Methods 1, 2, and 3. In this case, the difference between the maximum value and the minimum value of the measurement values is 10 Mbps or more, inexact results of the transmission channel estimation is obtained in consideration of the retransmission ratio by Estimation Methods 2 and 3. However, since the values of the original results of the transmission channel estimation are not large, a difference is not present in display of the results of the transmission channel estimation. Accordingly, there is no influence on the results of the transmission channel estimation.

FIG. 23 is a diagram illustrating as Case 5 Calculation Example 3 of the results of the transmission channel estimation performed when the transmission channel is in a poor state and thus the variations of a noise affect the transmission channel.

Case 5 shows an example in which the measurement results are obtained by performing the transmission channel estimation twelve times but the measurement results are not uniform. In Estimation Method 1, the average value Ave1 of the measurement values obtained by performing the transmission channel estimation replied twelve times is calculated. Since the average value Ave1≈24.7 Mbps, the result Eval1 of the transmission channel estimation is represented by an expression of (Ave1+Min1)/2=(24.7+15.0)/2≈19.8 Mbps. The calculation result Eval1=19.8 Mbps is used as the result Eval1 of the transmission channel estimation obtained by Estimation Method 1.

The average value Ave2 of the measurement values obtained by performing the transmission channel estimation twelve times in addition to the case (0 Mbps) of no reply is calculated by Estimation Method 2. Since the transmission channel estimation is all replied twelve times and thus the average value Ave2≈24.7 Mbps like Estimation Method 1, the result Eval2 of the transmission channel estimation is represented by the equation of Eval2=Ave2≈24.7 Mbps. Next, the difference Δ2 between the maximum value and the minimum value obtained by performing the transmission channel estimation replied twelve times is Δ2=15. In this case, since the difference Δ2 is larger than 10 Mbps, the expression of Eval2=Eval2×(1−0.35)=24.7×(1−0.35)≈16.0 Mbps is satisfied in consideration of the retransmission ratio. The estimation result Eval2=16.0 Mbps is used as the result Eval2 of the transmission channel estimation obtained by Estimation Method 2.

Like Estimation Method 2, the average value Ave3 of the measurement values obtained by performing the transmission channel estimation twelve times in addition to the case (0 Mbps) of no reply is calculated by Estimation Method 3. Since the average value Ave3≈24.7 Mbps, the result Eval3 of the transmission channel estimation is represented by the equation of Eval3≈24.7 Mbps. Next, the difference Δ3 between the maximum value and the minimum value obtained by performing the transmission channel estimation twelve times in addition to the case of no reply is calculated. Since the transmission channel estimation is all replied twelve times, the difference Δ3=15 like Estimation Method 2. Accordingly, since the expression of Eval3=Eval3×(1−0.35) ≈16.0 Mbps is satisfied in consideration of the retransmission ratio like Estimation Method 2, the estimation result Eval3=16.0 Mbps is used as the result Eval3 of the transmission channel estimation obtained by Estimation Method 3.

In Case 5, since the difference between the maximum value and the minimum value is 10 Mbps or more, the results of the transmission channel estimation in consideration of the retransmission ratio is obtained by the Estimation Methods 2 and 3. By the estimation Methods 2 and 3, it is possible to obtain the results of the transmission channel estimation on which the variations in the noise sufficiently reflect.

Third Embodiment

A display of the results of the transmission channel estimation obtained by the plural transmission channel estimation methods will be described according to a third embodiment.

FIG. 24 is a flowchart illustrating a process sequence of a method of displaying the results of the transmission channel estimation according to the third embodiment. In the third embodiment, two estimation methods of Estimation Methods 1 and 2 described in the second embodiment are used as examples. In this embodiment, the display (indicator) having three light emitting elements such as the LEDs 205A, 205B, and 205C shown in FIGS. 4A and 4B is used as an example of a unit displaying the results of the transmission channel estimation. Communicable rates indicating the states of the transmission channel and being obtained as the results of the transmission channel estimation are displayed as communication rates on the display.

First, a representative value Val (max) of the communication rates indicating the states of the transmission channel is calculated by Estimation Method 1 (Step S2401). Subsequently, a representative value Val (min) of the communication rates indicating the states of the states of the transmission channel is calculated by Estimation Method 2 (Step S2402). Subsequently, the number (Ln1 and Ln2) of lighting LEDs of the display which correspond to the obtainable communication rates is calculated on the basis of each of the representative values Val (max) and Val (min) (Step S2403). Subsequently, the maximum value and the minimum value of the communication rates are alternatively displayed on the display by the LEDs of the Ln1 and Ln2 (Step S2404).

FIG. 25 is a diagram illustrating a display example of the communication rates on the LEDs of the display. In FIG. 25, a black color and a white color indicate an ON state and an OFF state, respectively. In this example, three LEDs are used. That is, the number of lighting LEDs is zero when communication is not possible, and the number of lighting LEDs is one when the communication rate is less than 10 Mbps. In addition, the number of lighting LEDs is two when the communication rate is in the range from 10 Mbps to 30 Mbps, and the number of lighting LEDs is three when the communication rate is 30 Mbps or more. In this way, by displaying the communication rates in accordance with the number of lighting LEDs, a user can easily recognize the present state of the transmission channel and a communicable transmission rate under such an environment. In this case, it is desirable to display not the PHY rate but a UDP rate or a TCP rate as the communication rate.

Figure 26:
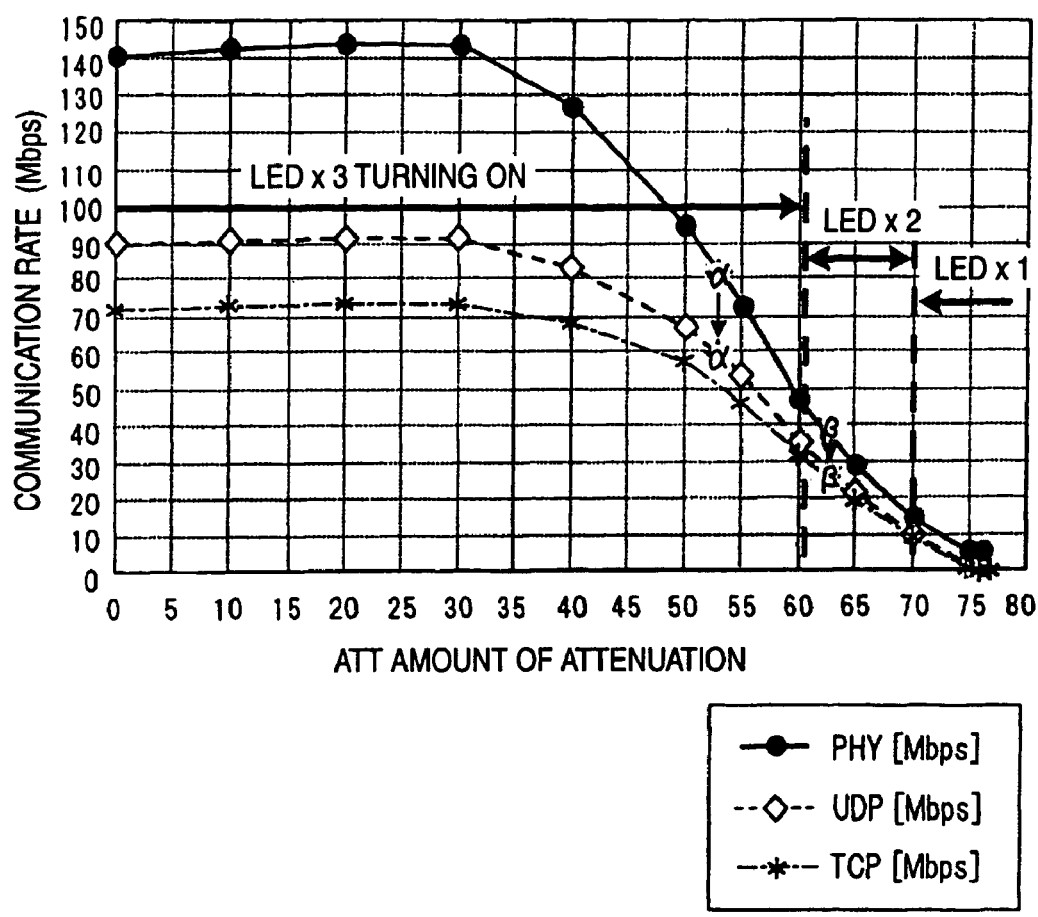
FIG. 26 is a characteristic diagram illustrating a relationship between the results of the transmission channel estimation and the number of LEDs turning on in the display.

FIG. 26 is a characteristic diagram illustrating a relationship between the result of the transmission channel estimation and the number of lighting LEDs in the display. In this embodiment, an example in which the number of lighting LEDs upon displaying the UDP rate as the communication rate is obtained from the PHY rates obtained as the results of the transmission channel estimation. The PHY rates Val1 (PHY) and Val2 (PHY) are obtained by Estimation Method 1 and Estimation Method 2, respectively, and the number of lighting LEDs is calculated from the PHY rates. For example, when the PHY rate Val1 (PHY) obtained by Estimation Method 1 is 80 Mbps, the UDP rate is 58 Mbps with reference to the relationship of the characteristic diagram of FIG. 26 and is set as the representative value Val (max) (see a character cc in the drawing). Accordingly, the number Ln1 of lighting LEDs is three as the maximum value of the communication rate. In addition, when the PHY rate Val2 (PHY) obtained by Estimation Method 2 is 40 Mbps, the UDP rate is 28 Mbps and is set as the representative value Val (min) (see a character β in the drawing). Accordingly, the number Ln2 of lighting LEDs is two as the minimum value of the communication rate.

FIGS. 27A to 27E are diagrams illustrating an example of expressing the results of the transmission channel estimation obtained by Estimation Method 1 and Estimation Method 2 in the form of time-series. In this embodiment, as the example of expressing the plural results of the transmission channel estimation, there is exemplified a case where the number Ln1 of lighting LEDs indicating the communication rate as the result of the transmission channel estimation obtained by Estimation Method 1 and the number Ln2 of lighting LEDs indicating the communication rate as the result of the transmission channel estimation obtained by Estimation Method 2 are alternatively displayed at an interval of one second. In this case, the number Ln1 and the number Ln2 are alternatively displayed three times at the interval of one second. However, the period of time and the number of the display may be changed to any value. FIG. 27A shows a case of Ln1=3 and Ln2=3 and expresses that the transmission channel is in a good state since both the estimation results are 30 Mbps or more. FIG. 27B shows a case of Ln1=3 and Ln2=2, and FIG. 27C shows a case of Ln1=3 and Ln2=1 and expresses that the estimation results obtained by Estimation Method 1 are 30 Mbps or more, the estimation results obtained by Estimation Method 2 are in the range from 10 Mbps to 30 Mbps or less than 10 Mbps, and the variations in the noise affect the transmission channel. FIG. 27D shows a case of Ln1=2 and Ln2=2 and expresses that both the estimation results are in the range from 10 Mbps to 30 Mbps and the transmission channel is not in a good state. FIG. 27E shows a case of Ln1=2 and Ln2=1 and expresses that the estimation results obtained by Estimation Method 1 are in the range from 10 Mbps to 30 Mbps, the estimation results obtained by Estimation Method 2 are less than 10 Mbps, the transmission channel is not in a good state, and the variations in the noise affect the transmission channel.

As shown in FIGS. 27A and 27D, when the value of Ln1 is the same as that of Ln2, number of lighting LEDs is constant, as a result. On the other hand, as shown in FIGS. 27B, 27C and 27E, when the value of Ln1 is different from that of Ln2, the number of lighting LEDs is changed at the interval of one second. That is, the difference between the PHY rates Val1 (PHY) obtained by the Estimation Method 1 and Val2 (PHY) obtained by the Estimation Method 2 is larger, there is a high possibility that the value of Ln1 is the same as that of Ln2.

By alternatively displaying the results of the transmission channel estimation obtained by Estimation Method 1 and the results of the transmission channel estimation obtained by Estimation Method 2 in this manner, it is possible to display the communication rate in the state where the variations of the noise disappear and the communication rate in the state where the present noise is present. In this way, a user can recognize the communicable transmission rate in the best state of the transmission channel and the actual transmission rate on which the variations in the noise reflect. As an estimation result notification unit notifying the communication rates as the results of the transmission channel estimation, the invention is not limited to the display of the above-described LEDs. A display displaying values of the communication rates on a liquid crystal display may be used or a method of notifying the communication rates in the form of voices may be used. As the method of notifying the communication rates in the form of voices, the communication rates may be expressed by the height of voice by changing the height of voice in accordance with the communication rates obtained by the two estimation methods. Alternatively, the communication rates may be expressed by the volume of voice by changing the volume of voice in accordance with the communication rates obtained by the two estimation methods.

Fourth Embodiment

A fourth embodiment describes an example in which a bi-directional transmission channel estimation is performed between communication apparatuses.

Figure 28A:
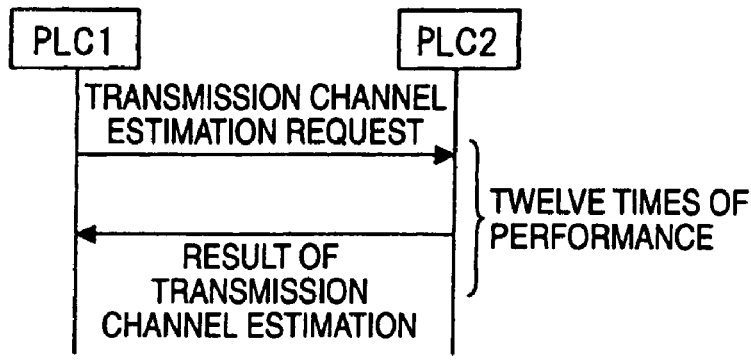
FIG. 28A is a diagram for explaining a sequence of a one directional transmission channel estimation.
Figure 28B:
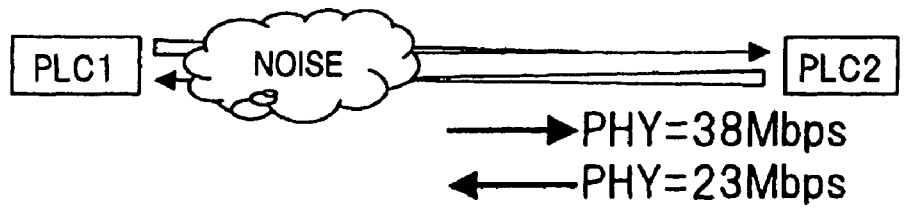
FIG. 28B is a diagram for explaining the results of the one directional transmission channel estimation.

FIGS. 28A and 28B are diagrams for explaining the results of a one directional transmission channel estimation. FIG.

28A shows a sequence of the transmission channel estimation and FIG. 28B shows the results of the transmission channel estimation.

In the above-described first to third embodiments, as shown in FIG. 28A, a first power line communication apparatus PLC1 (105) transmits the transmission channel estimation request to a second power line communication apparatus PLC2 (106). When receiving the transmission channel estimation request, the second power line communication apparatus PLC2 performs the transmission channel estimation and then replies the results of the transmission channel estimation to the first power line communication apparatus PLC1. The transmission channel estimation is performed twelve times, for example. In this case, only single directional (only direction from PLC1 to PLC2) communication rate from the first power line communication apparatus PLC1 to the second power line communication apparatus PLC2 is measured.

In an actual transmission channel, SN is better when a side closer to a noise source transmits data. Accordingly, the communication rate is improved. That is, the communication rates are asymmetrical in communication directions between two communication apparatuses. In FIG. 28B, when the noise source exists near the first power line communication apparatus PLC1, for example, the PHY rate of the communication direction from the first power line communication apparatus PLC1 to the second power line communication apparatus PLC2 is 38 Mbps and the PHY rate of the communication direction from the second power line communication apparatus PLC2 to the first power line communication apparatus PLC1 is 23 Mbps. In this state, when a direction in which rate measurement is performed in actual data communication is reverse to a direction in which simple rate measurement is performed by the transmission channel estimation, the estimation results and actual measurement values become different from each other. In order to solve this problem, in the fourth embodiment, the transmission channel estimation is performed in a reverse direction and a difference between the estimation results and the actual communication rates is made smaller by displaying the maximum value and the minimum value of the bi-directional estimation results.

Figure 29:
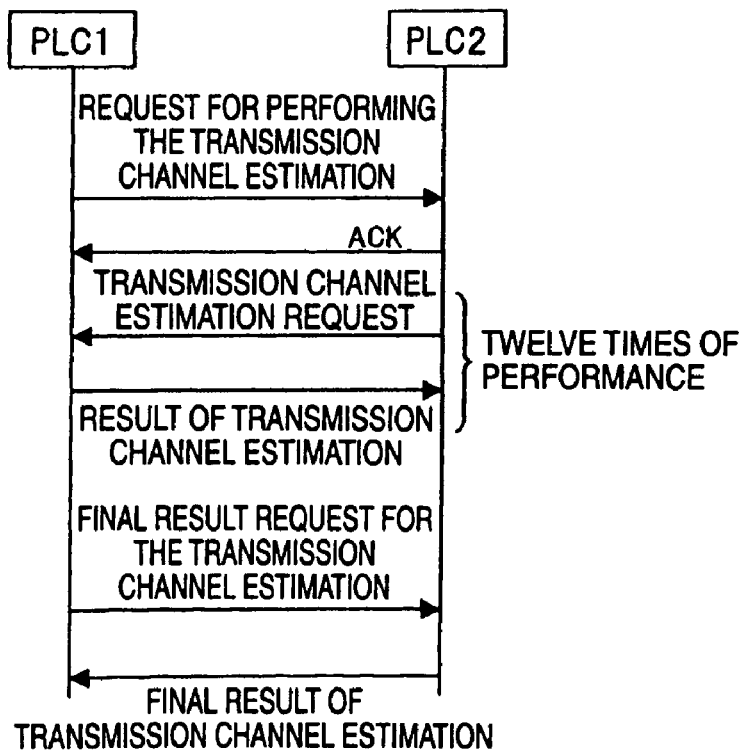
FIG. 29 is a diagram illustrating a sequence of a bi-directional transmission channel estimation according to a fourth embodiment.

FIG. 29 is a diagram illustrating a sequence of the bi-directional transmission channel estimation according to the fourth embodiment. First, the first power line communication apparatus PLC1 transmits a request packet for performing the transmission channel estimation to the second power line communication apparatus PLC2. When receiving the request packet for performing the transmission channel estimation, the second power line communication apparatus PLC2 replies an ACK indicating that the request packet for performing the transmission channel estimation is normally received. Next, the second power line communication apparatus PLC2 transmits the transmission channel request to the first power line communication apparatus PLC1. When receiving the transmission channel estimation request, the first power line communication apparatus PLC1 performs the transmission channel estimation and replies the results of the transmission channel estimation to the second power line communication apparatus PLC2. The transmission channel estimation is performed twelve times, for example. Subsequently, the first power line communication apparatus PLC1 waits some time until the transmission channel estimation in a direction from the PLC2 to the PLC1 finishes. The first power line communication apparatus PLC1 transmits a request for the final results of the transmission channel estimation to the second power line communication apparatus PLC2 to inquire the final results of the transmission channel estimation. In this way, the second power line communication apparatus PLC2 replies a representative value of the results of the transmission channel estimation in the direction from the PLC2 to the PLC1 to the first power line communication apparatus PLC1.

The above-described sequence may also be modified. For example, the first power line communication apparatus PLC1 receives the request packet for the transmission channel estimation transmitted from the second power line communication apparatus PLC2, collects and stores the results of the transmission channel estimation therein, and may calculate the representative value of the results of the transmission channel estimation in the direction from the PLC2 to the PLC1. The final results of the transmission channel estimation in the direction from the PLC2 to the PLC1 may be notified to the first power line communication apparatus PLC1 without waiting the final result request for the transmission channel estimation after the second power line communication apparatus PLC2 finishes the calculation.

Figures 30A, 30B:
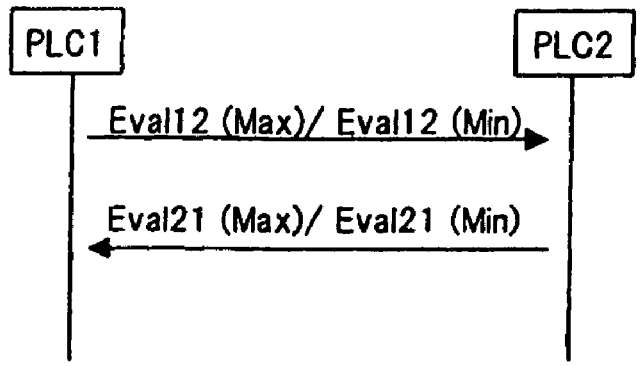
FIG. 30A is a diagram illustrating a sequence of the bi-directional transmission channel estimation.
FIG. 30B is a diagram illustrating the results of the bi-directional transmission channel estimation.
Figure 32:
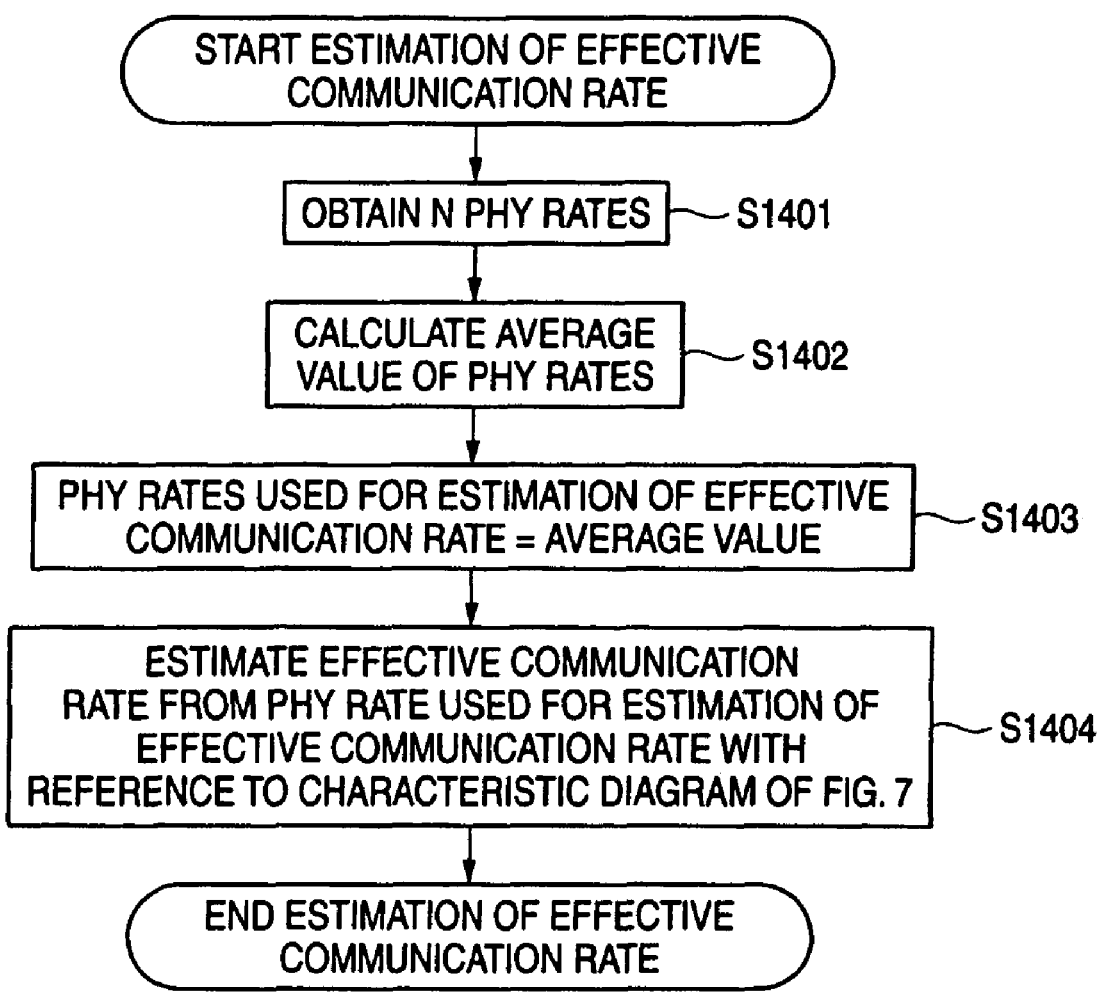
FIG. 32 is a flowchart illustrating a known process of estimating an effective communication rate.

Next, displaying the results of the bi-directional transmission channel estimation will be described according to this embodiment. FIGS. 30A and 30B are diagrams illustrating the results of the bi-directional transmission channel estimation. FIG. 31 is a flowchart illustrating a process sequence of a method of displaying the results of the transmission channel estimation according to the fourth embodiment.

In this embodiment, as shown in FIGS. 30A and 30B, the results of the transmission channel estimation in the direction from the PLC1 to the PLC2 from the first power line communication apparatus PLC1 to the second power line communication apparatus PLC2 are set to Eval12. The maximum value and the minimum value are set to Eval12 (max) and Eval12 (min), respectively. In addition, the results of the transmission channel estimation in the direction from PLC2 to PLC1 from the second power line communication apparatus PLC2 to the first power line communication apparatus PLC1 are set to Eval21. The maximum value and the minimum value are set to Eval21 (max) and Eval21 (min), respectively.

First, as the result of the transmission channel estimation, a representative value Val (max) of the maximum value of the communication rate which indicates the state of the transmission channel is represented by an equation of Val (max) =Eval12 (max) (Step S3101). Subsequently, a representative value Val (min) of the minimum value of the communication rate which indicates the state of the transmission channel is represented by Val (min)=Eval12 (min) (Step S3102). Subsequently, the maximum values Eval12 (max) and Eval21 (max) of the results of the bi-directional transmission channel are compared to each other (Step S3103). When Eval12 (max) is larger than Eval21 (max), the equation of Val (max) =Eval12 (max) is used. Alternatively, when Eval12 (max) is smaller than Eval21 (max), the equation of Val (max)=Eval21 (max) is used (Step S3104).

Subsequently, the minimum values Eval12 (min) and Eval21 (min) of the results of the bi-directional transmission channel estimation are compared to each other (Step S3105). When Eval12 (min) is smaller than Eval21 (min), the equation of Val (min)=Eval12 (min) is used. Alternatively, when Eval12 (min) is larger than Eval21 (min), the equation of Val (min)=Eval21 (min) is used (Step S3106).

The number (Ln1 and Ln2) of LEDs of the display corresponding to the estimated communication rates are calculated on the basis of the respective values of the representative values Val (max) and Val (min) (Step S3107). Subsequently, the maximum value and the minimum value of the communication rates are displayed alternatively by the numbers Ln1 and Ln2 of LEDs of the display (Step S3108). In this way, it is possible to display the maximum value and the minimum value of the communication rates on which the results of the bi-directional transmission channel estimation reflect. In addition, as a modified example, an average value of the results of the bi-directional transmission channel may be calculated and the final estimation results are calculated to display the estimation results, instead of the displaying of the maximum value and the minimum value of the results of the bi-directional transmission channel estimation.

In this way, by performing the bi-directional transmission channel estimation between the two communication apparatuses and displaying the communication rates, it is possible to obtain the respective results of the bi-direction transmission channel estimation when the results of the transmission channel estimation are different in accordance with the communication direction. Accordingly, a user can grasp the different results of the transmission channel estimation in accordance with the communication direction and recognize the communication rates on which the state of the transmission channel reflects.

This application is based upon and claims the benefit of priority of Japanese Patent Applications No. 2007-242159 filed on Sep. 19, 2007 and No. 2008-36046 filed on Feb. 18, 2008, the contents of which are incorporated herein by reference in its entirety.

What is claimed is:

1. A communication apparatus which transmits data to another communication apparatus through a transmission channel, the communication apparatus comprising:
   a display winch displays information corresponding to a communication rate; and
   a controller being configured to:
   acquire a communication rate by transmitting a predetermined signal to the other communication apparatus,
   acquire a first communication rate having a smaller value than the acquired communication rate in response to the acquired communication rate,
   acquire a second communication rate corresponding to a predetermined protocol in response to the first communication rate, and
   permit the display to display information corresponding to the second communication rate.

2. The communication apparatus according to claim 1, wherein the controller is further configured to:
   acquire an average communication rate by transmitting the predetermined signal a plurality of times to the other communication apparatus,
   acquire a third communication rate having a smaller value than the average communication rate in response to the acquired average communication rate,
   acquire a fourth communication rate corresponding to the predetermined protocol in response to the third communication rate, and
   permit the display to display information corresponding to the fourth communication rate.

3. The communication apparatus according to claim 2, wherein the controller is further configured to acquire the third communicate rate using a minimum communication rate among a plurality of communication rates acquired by transmitting the predetermined signal the plurality of times.

4. The communication apparatus according to claim 3, wherein the controller acquires the third communicate rate with the minimum communication rate being weighted.

5. The communication apparatus according to claim 1, wherein the predetermined signal is a signal which is obtained by performing predetermined modulation on a plurality of carriers.

6. The communication apparatus according to claim 3, wherein the controller acquires the fourth communication rate from an expression of (the minimum communication rate+(the average communication rate−the minimum communication rate)/4).

7. The communication apparatus according to claim 2, wherein the controller is further configured to:
   acquire a minimum communication rate and a maximum communication rate among a plurality of communication rates acquired by transmitting the predetermined signal the plurality of times, and
   permit the display to display information corresponding to the minimum communication rate and information corresponding to the maximum communication rate.

8. The communication apparatus according to claim 1, wherein the transmission channel is supplied with AC voltage having a predetermined period.

9. The communication apparatus according to claim 8, further comprising:
   a detector which detects timing on the basis of timing at which a value of the AC voltage is zero, and
   wherein the controller transmits the predetermined signal on the basis of the timing.

10. The communication apparatus according to claim 9, wherein the controller successively transmits the predetermined signal more than once.

11. The communication apparatus according to claim 10, wherein the controller determines a number of transmissions of the predetermined signal on the basis of a period time of the AC voltage.

12. The communication apparatus according to claim 1, wherein:
   the display includes a plurality of light emitting diodes (LEDs), and
   the controller controls a number of the LEDs to be lighted in accordance with a magnitude of the second communication rate.

13. A communication system in which a first communication apparatus and a second communication apparatus transmit data to one another through a transmission channel,
   wherein the first communication apparatus includes:
      a display which displays information corresponding to a communication rate; and
      a first controller being configured to:
         acquire a communication rate by transmitting a predetermined signal to the second communication apparatus,
         acquire a first communication rate having a smaller value than the acquired communication rate in response to the acquired communication rate,
         acquire a second communication rate corresponding to a predetermined protocol in response to the first communication rate, and
         permit the display to display information corresponding to the second communication rate, and
   wherein the second communication apparatus includes:
      a communication unit which receives the predetermined signal from the first communication apparatus; and
      a transmission unit which transmits information corresponding to the communication rate to the first communication apparatus in response to a reception result of the predetermined signal.

14. A communication method of transmitting data through a transmission channel by a first communication apparatus and a second communication apparatus,
   wherein the first communication apparatus:
      acquires a communication rate by transmitting a predetermined signal to the second communication apparatus, acquires a first communication rate having a smaller value than the acquired communication rate in response to the acquired communication rate, acquires a second communication rate corresponding to a predetermined protocol in response to the first communication rate, and permits a display to display information corresponding to the second communication rate, and wherein the second communication apparatus:

receives the predetermined signal from the first communication apparatus; and transmits information corresponding to the communication rate to the first communication apparatus in response to a reception result of the predetermined signal.

15. A communication method for transmitting data to a communication apparatus through a transmission channel, the method comprising:

acquiring a communication rate by transmitting a predetermined signal to the communication apparatus;

acquiring a first communication rate having a smaller value than the acquired communication rate in response to the acquired communication rate;

acquiring a second communication rate corresponding to a predetermined protocol in response to the first communication rate; and controlling a display to display information corresponding to the second communication rate.

16. An integrated circuit used in a communication apparatus which transmits data to another communication apparatus through a transmission channel and includes a display which displays information corresponding to a communication rate, the integrated circuit comprising:

a controller being configured to:

acquire a communication rate by transmitting a predetermined signal to the other communication apparatus, acquire a first communication rate having a smaller value than the acquired communication rate in response to the acquired communication rate, acquire a second communication rate corresponding to a predetermined protocol in response to the first communication rate, and permit a display to display information corresponding to the second communication rate.

* * * * *